United States Patent [19]
Goto

[11] Patent Number: 5,710,667
[45] Date of Patent: Jan. 20, 1998

[54] FOCUS DETECTING OPTICAL SYSTEM

[75] Inventor: Hisashi Goto, Yokohama, Japan

[73] Assignee: Olympus Optical Co., Ltd., Tokyo, Japan

[21] Appl. No.: 412,280

[22] Filed: Mar. 28, 1995

[30] Foreign Application Priority Data

Mar. 29, 1994 [JP] Japan .................................. 6-58958

[51] Int. Cl.$^6$ ........................... G02B 5/18; G02B 27/44; H01L 27/00
[52] U.S. Cl. ...................... 359/569; 359/566; 359/575; 250/208.1
[58] Field of Search .................................. 359/566, 569, 359/571, 742, 565, 575; 250/208.1; 369/103, 112, 44

[56] References Cited

U.S. PATENT DOCUMENTS

| | | | |
|---|---|---|---|
| 5,173,599 | 12/1992 | Setani | 250/208.1 |
| 5,367,153 | 11/1994 | Suda et al. | 250/208.1 |
| 5,499,138 | 3/1996 | Iba | 359/569 |

FOREIGN PATENT DOCUMENTS

| | | |
|---|---|---|
| 55-118019 | 9/1980 | Japan . |
| 58-106511 | 6/1983 | Japan . |
| 59-160109 | 9/1984 | Japan . |
| 60-32012 | 2/1985 | Japan . |
| 61-134716 | 6/1986 | Japan . |
| 61-255316 | 11/1986 | Japan . |
| 62-3215 | 1/1987 | Japan . |
| 63-127217 | 5/1988 | Japan . |

OTHER PUBLICATIONS

Ono, "Recent Advances in Holographic Optical Elements," Opto–Electronics Research Laboratories, NEC Corporation, Oct. 29, 1992, pp. 126–130.

Farn et al, "Diffractive Doublet Corrected On–Axis at Two Wavelengths," SPIE vol. 1354, International Lens Design Conference, 1990, pp. 24–29.

Londono et al, "The Design of Achromatized Hybrid Diffractive Lens Systems," SPIE vol. 1354, International Lens Design Conference, 1990, pp.30–37.

Southwell, "Binary Optics From a Raytracing Point of View," SPIE vol. 1354, International Lens Design Conference, 1990, pp. 38–42.

Yuan, "Calculation of Wave Aberration in Optical Systems With Holographic Optical Elements," SPIE vol. 1354, International Lens Design Conference, 1990, pp. 43–52.

Londono, et al, "Modeling Diffraction Efficiency Effects When Designing Hybrid Diffractive Lens Systems", Applied Optics, vol. 31, No. 13, May 1992, pp. 2248–2252.

Primary Examiner—Paul M. Dzierzynski
Assistant Examiner—Andrey Chang
Attorney, Agent, or Firm—Watson Cole Stevens Davis, P.L.L.C.

[57] ABSTRACT

A focus detecting optical system for detecting a focus condition of an image of an object to be picked-up by an image forming lens including a condenser lens arranged in a vicinity of a predetermined focal plane of the image forming lens, aperture stop having a plurality of apertures, a plurality of image reforming lenses and a plurality of light receiving element arrays. At least one diffractive optical element having a lens function due to a diffraction is provided on a surface of the condenser lens or image reforming lenses. The diffractive optical element may be formed by kinoform or binary optical element having a step-wise configuration. The diffractive optical element may be formed in a surface of an infrared cut filter.

18 Claims, 32 Drawing Sheets

FIG_1
PRIOR ART
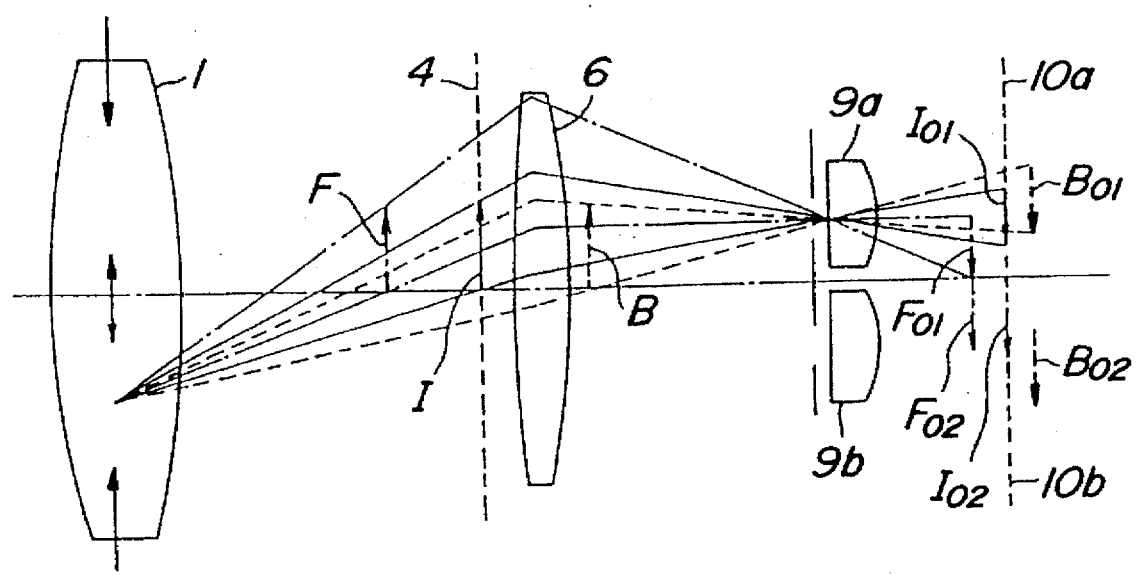

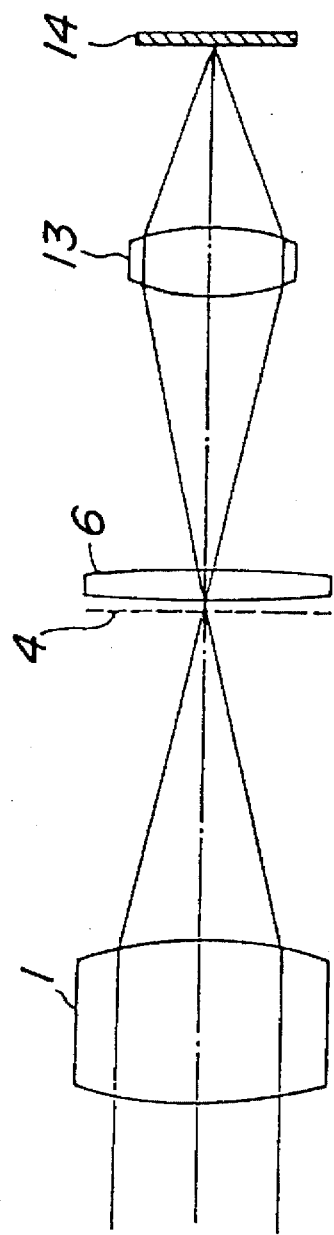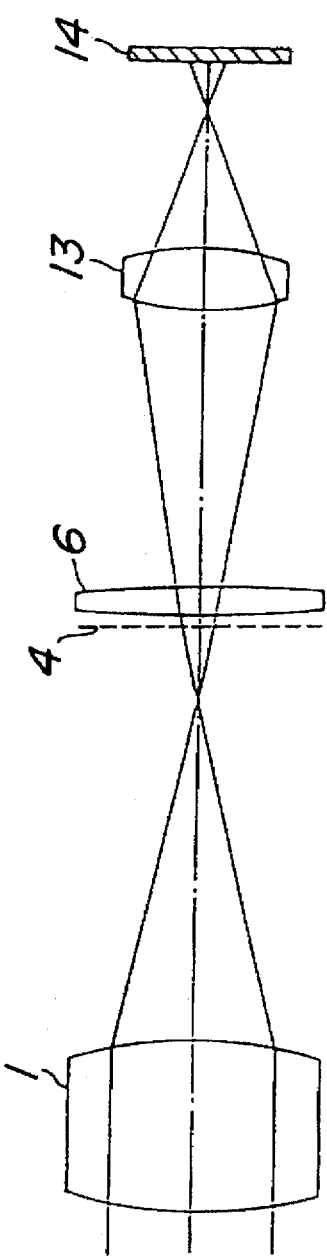
FIG. 2A PRIOR ART
FIG. 2B PRIOR ART

FIG_3
PRIOR ART
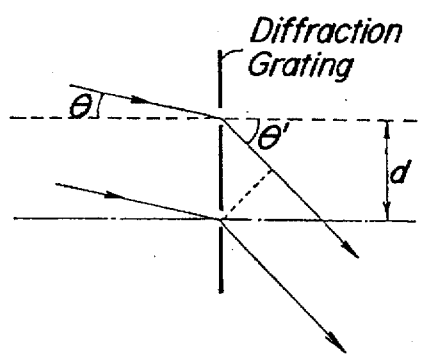
FIG_4
PRIOR ART
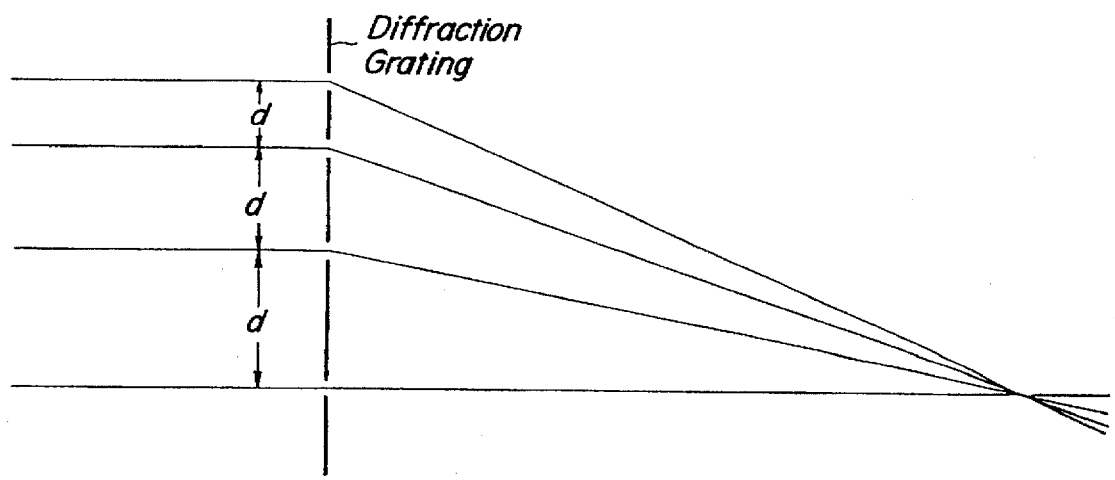

FIG_5
PRIOR ART
$\dfrac{m\lambda}{n-1}$
FIG_6A
PRIOR ART
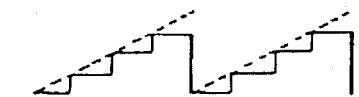
Four-step
Simulation
FIG_6B
PRIOR ART
Eight-step
Simulation FIG_7
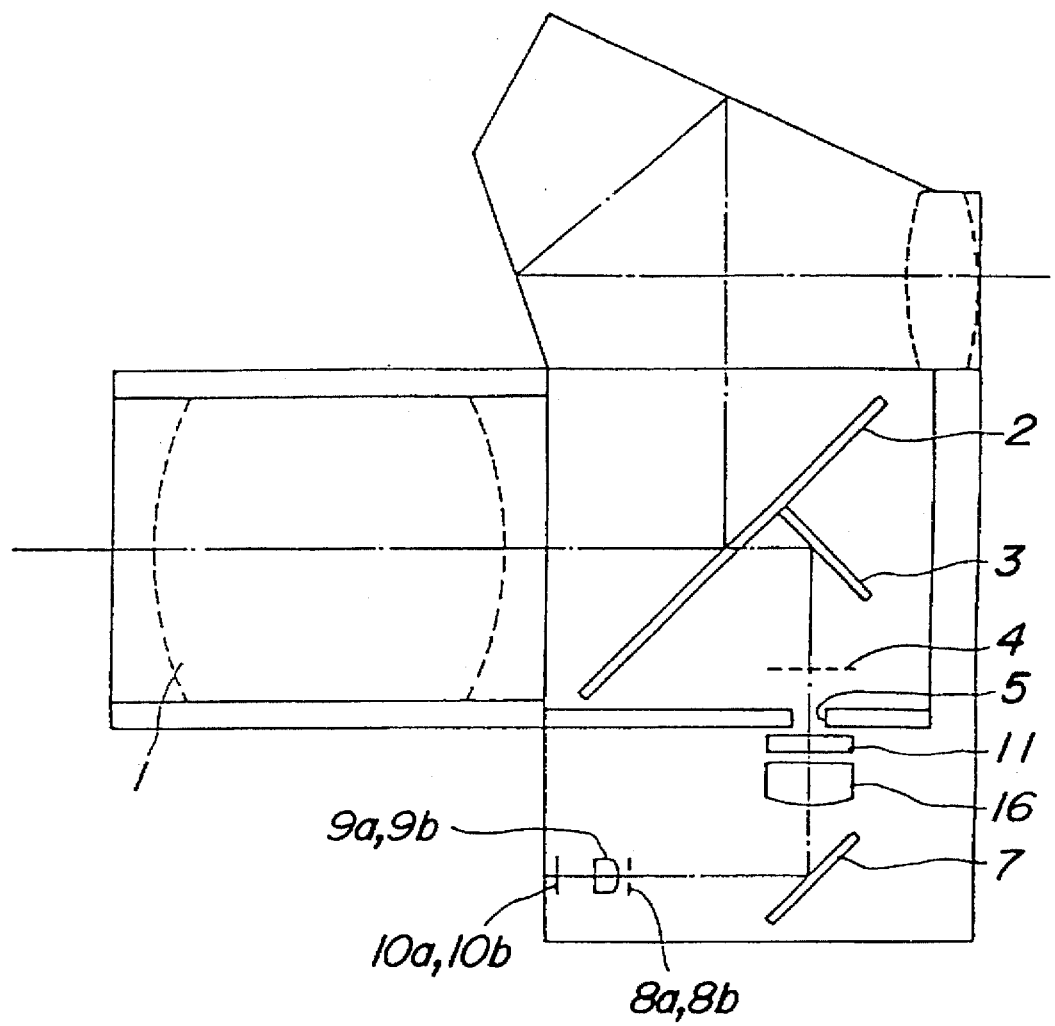

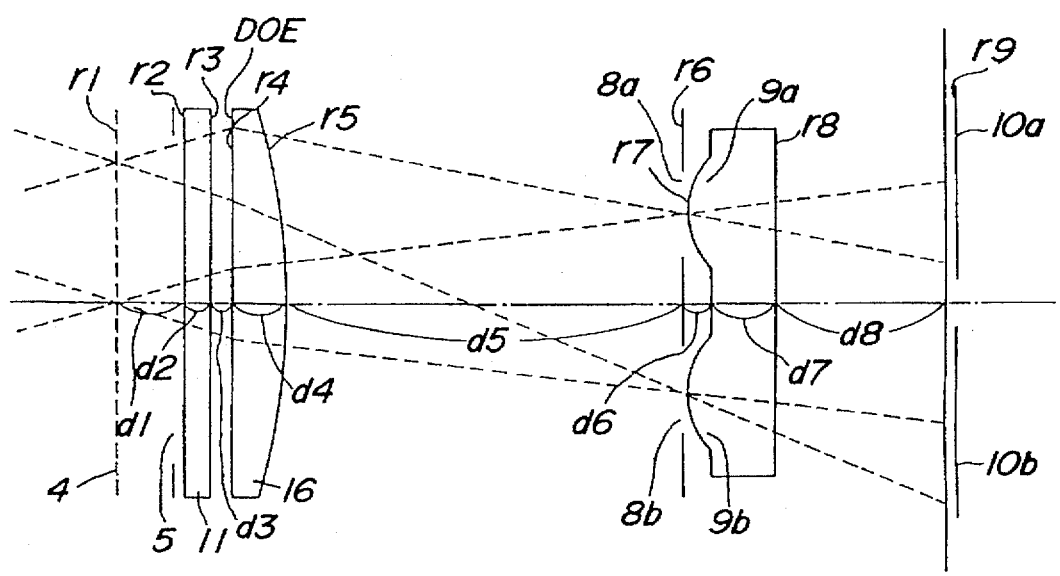
FIG_8

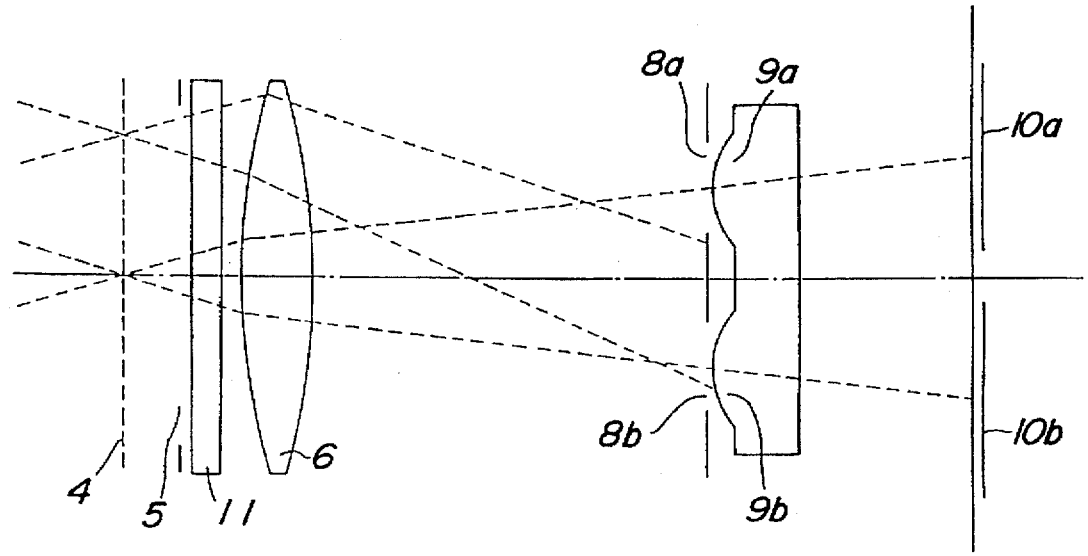
FIG_9
PRIOR ART

FIG_11

FIG_12

FIG_13

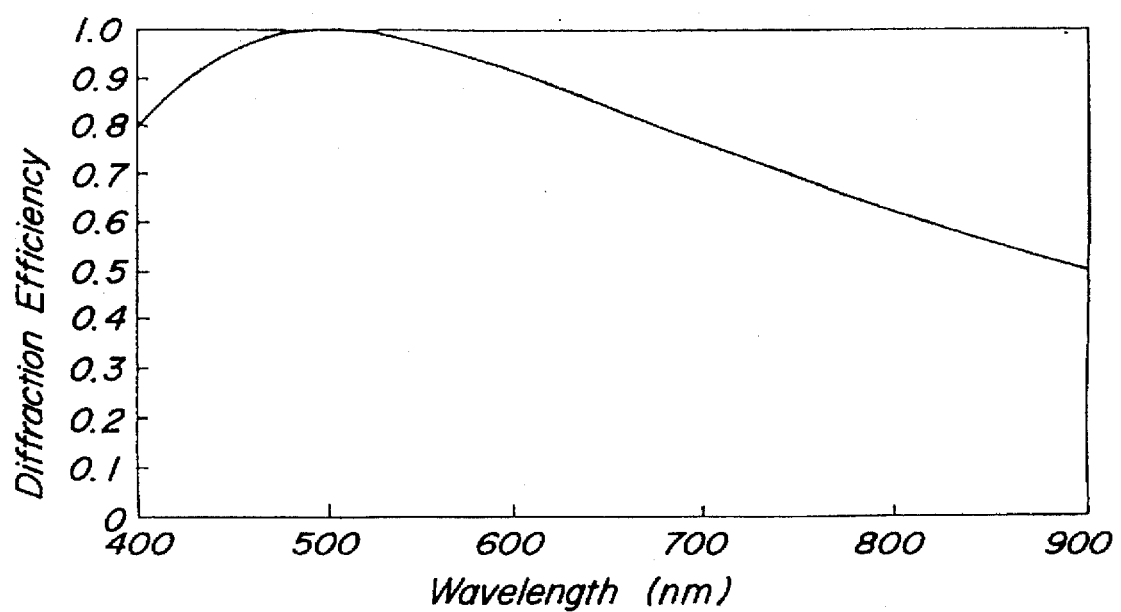
FIG_15

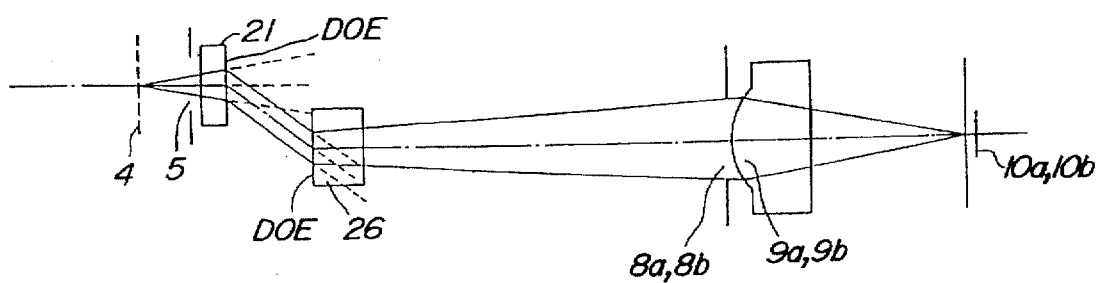
FIG_16

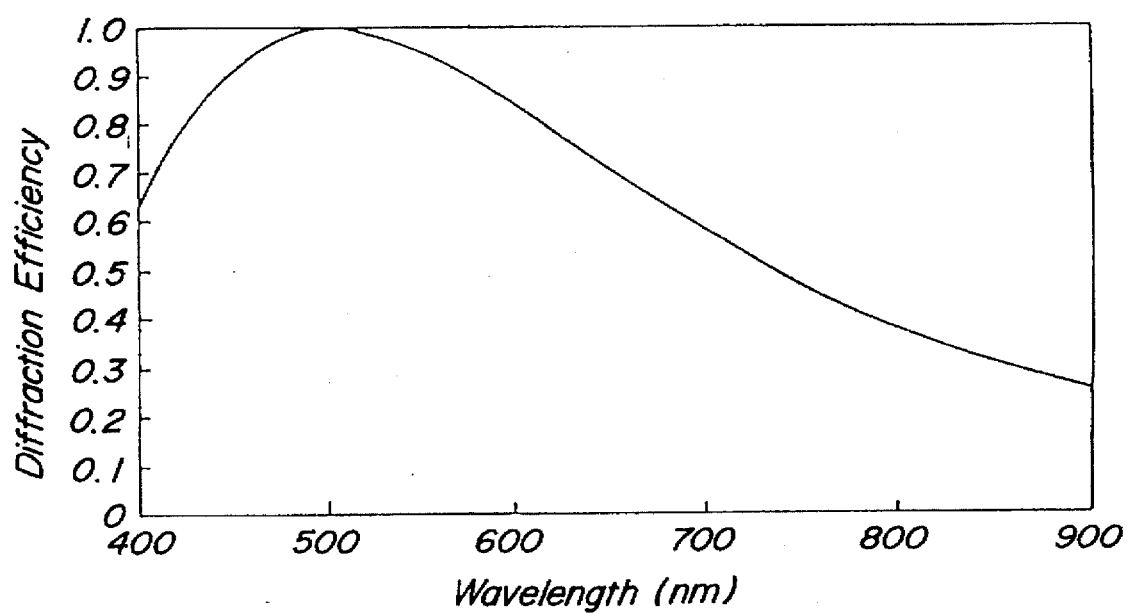
FIG_17

FIG_18A
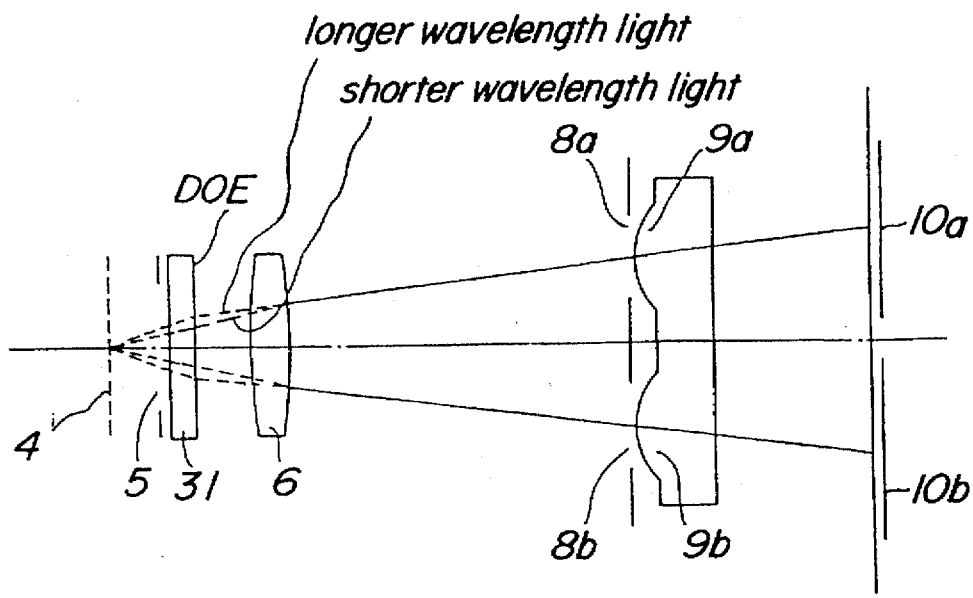
FIG_18B
PRIOR ART
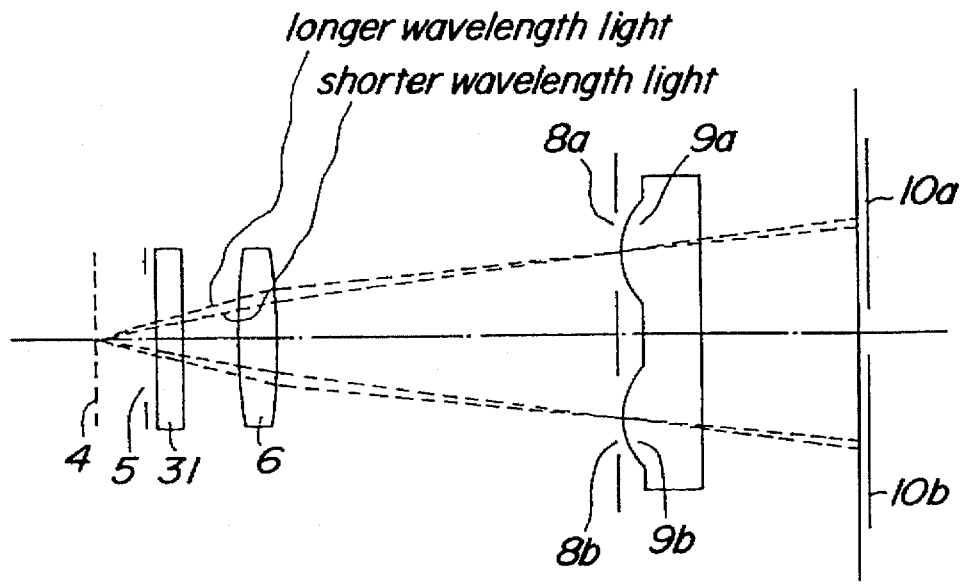

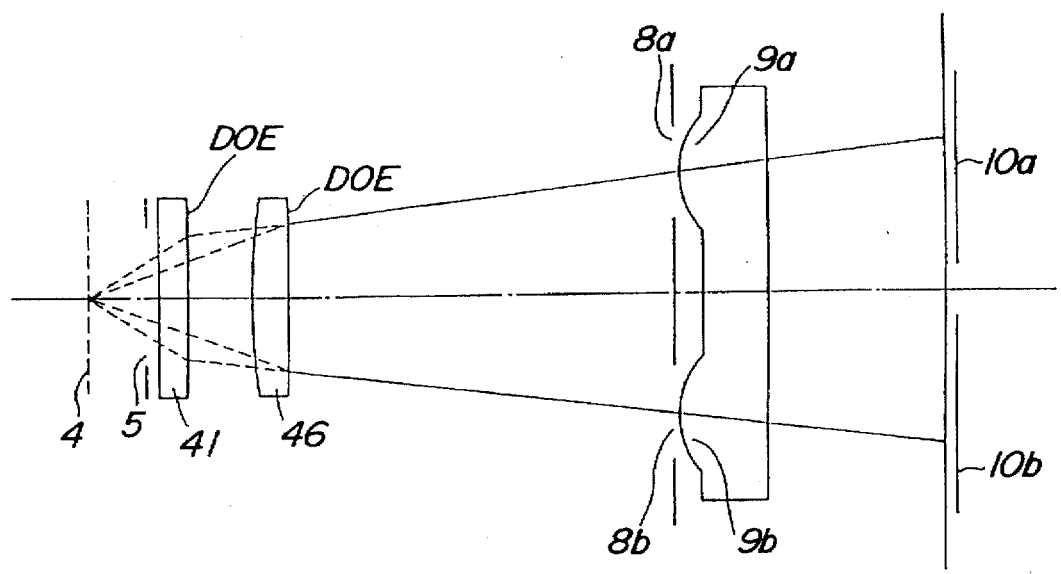
FIG_20

FIG_21
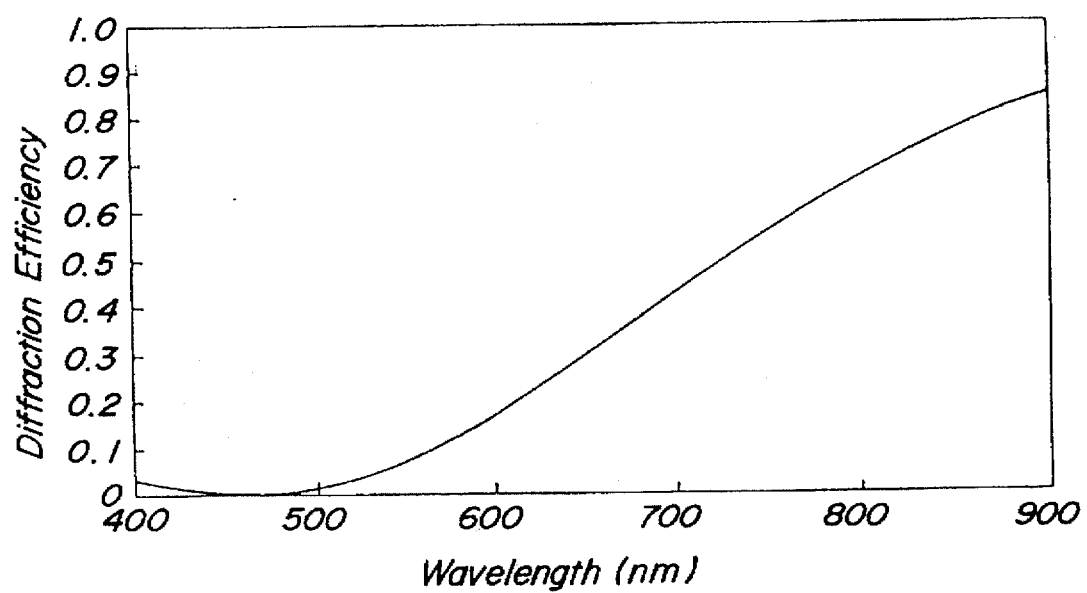

FIG_22
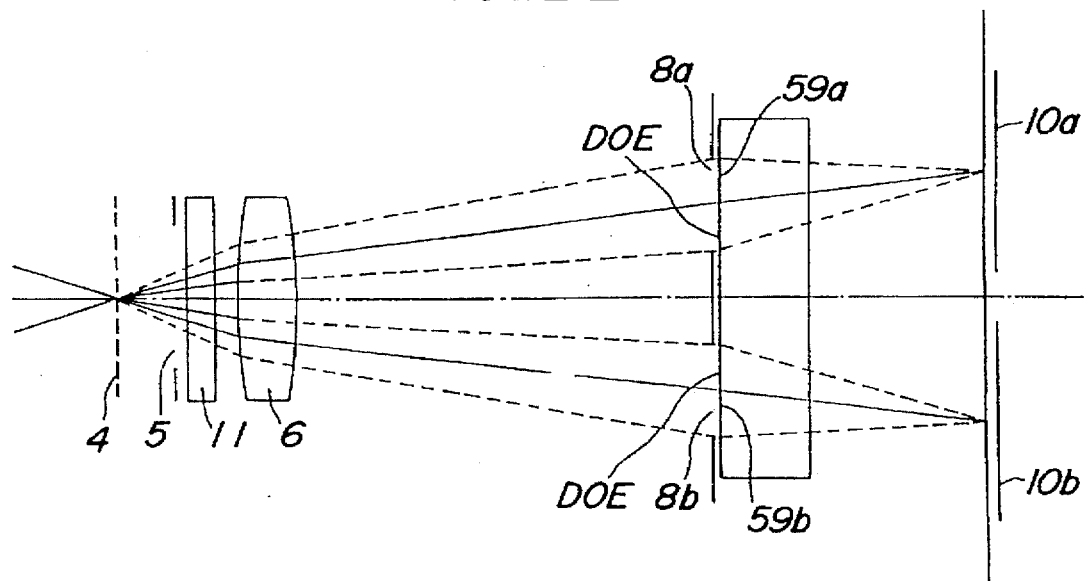
FIG_23
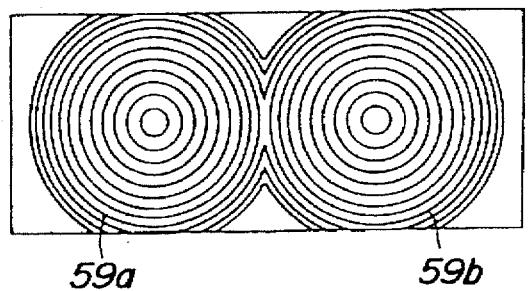

FIG._25
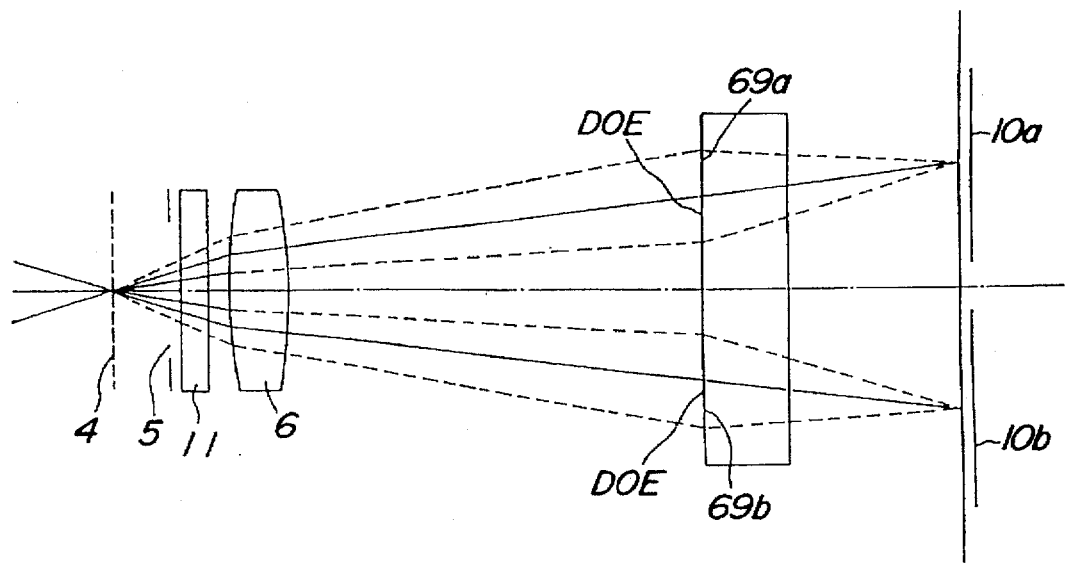
FIG._26
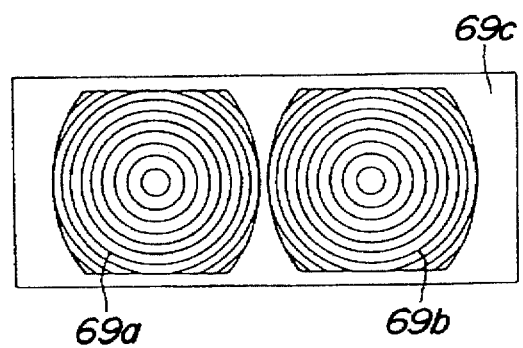

FIG_29
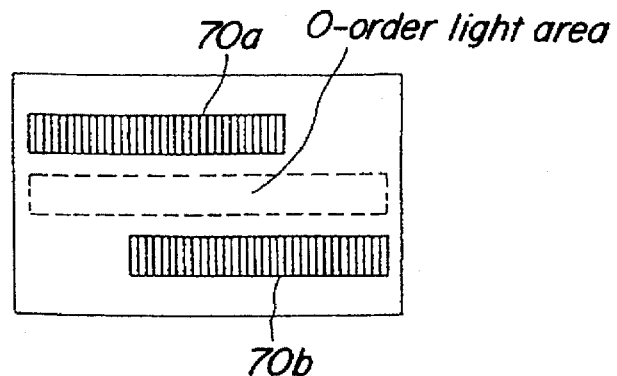
FIG_30
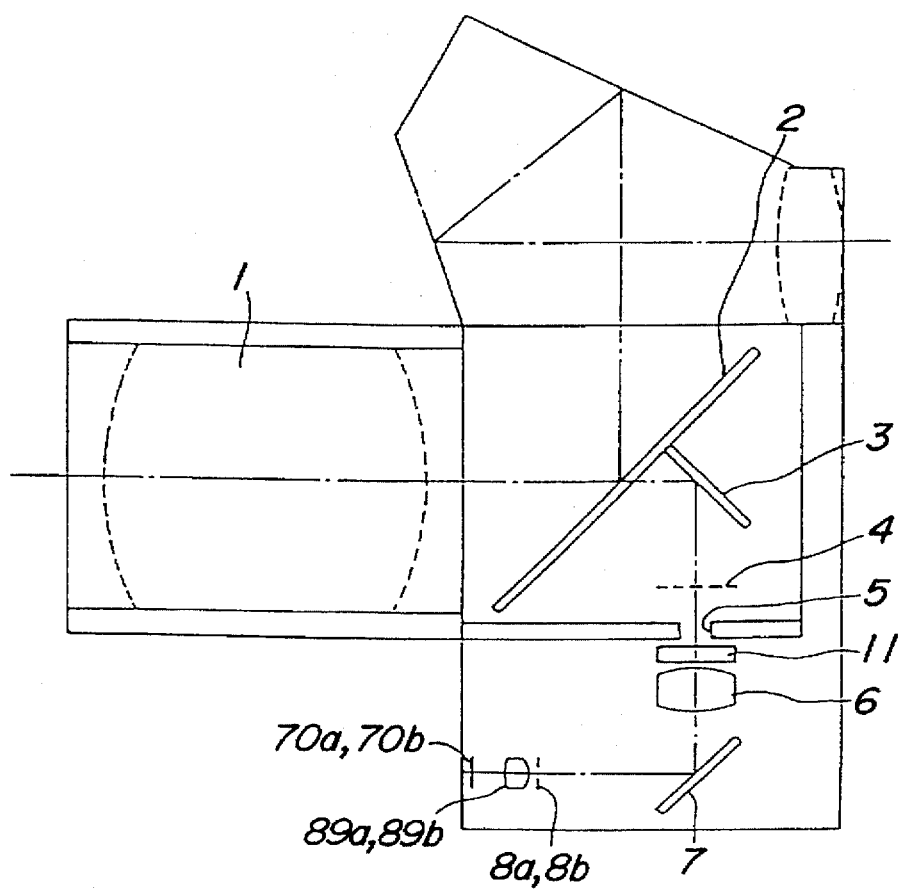

FIG_31A
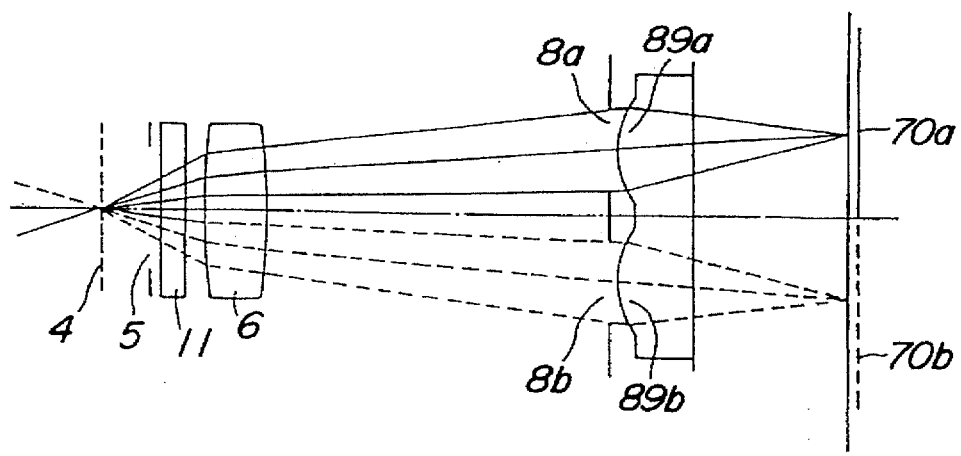
FIG_31B
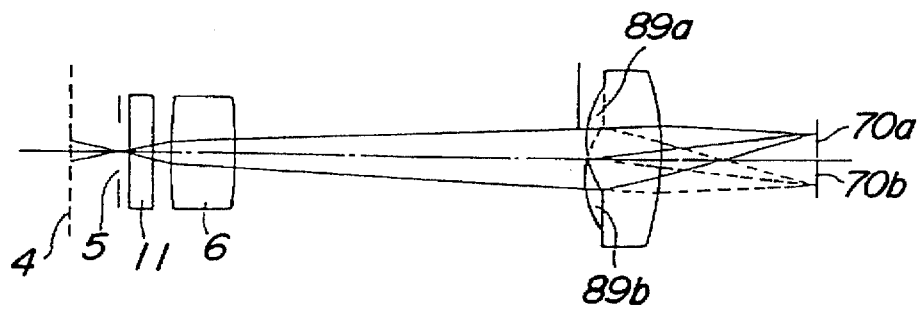

FIG_35A
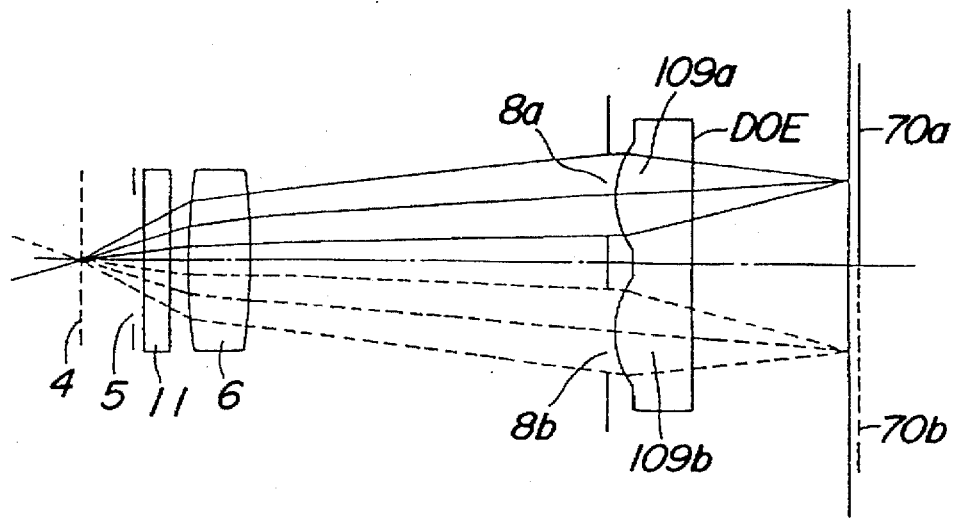
FIG_35B
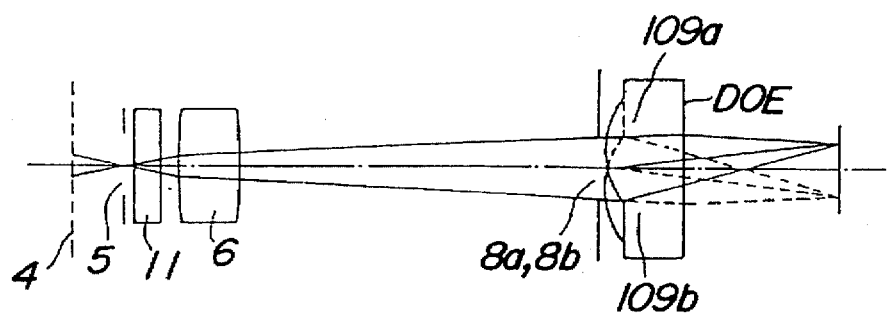
FIG_36
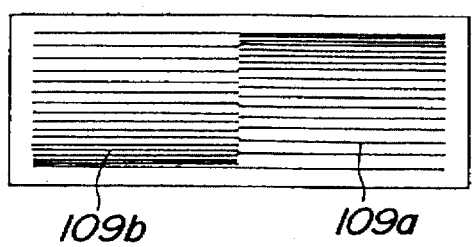

FIG_37
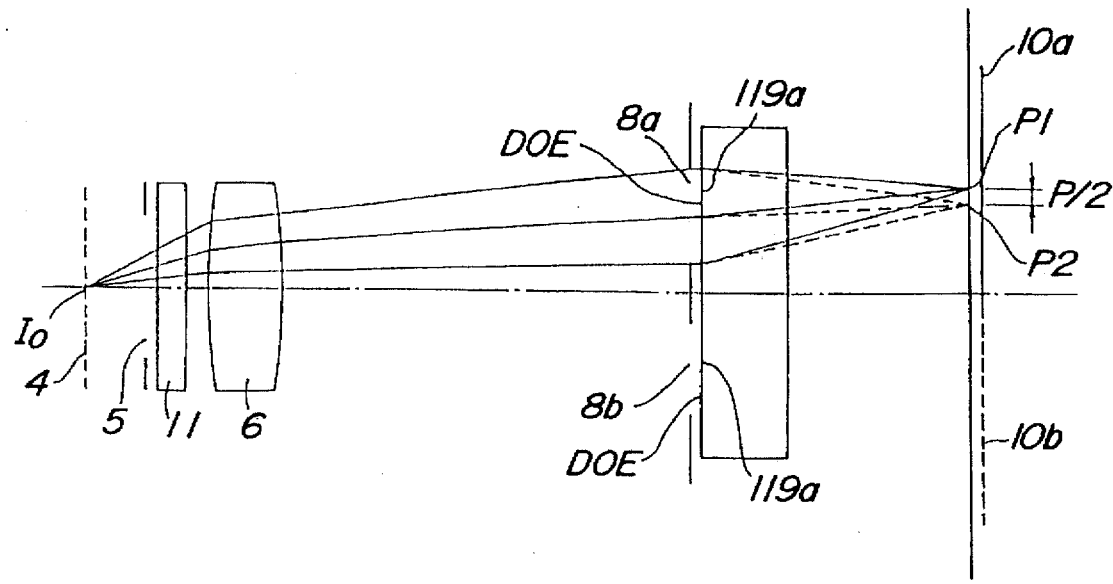
FIG_38
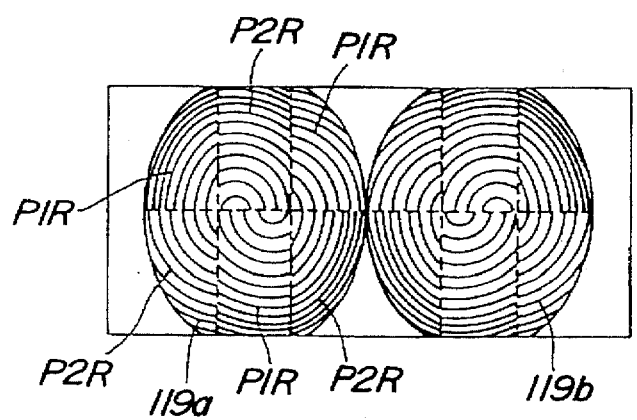

FIG_39
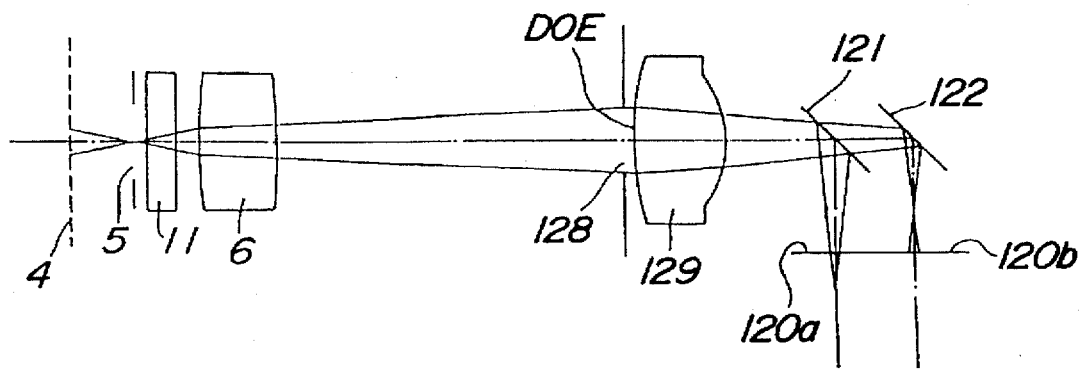
FIG_40
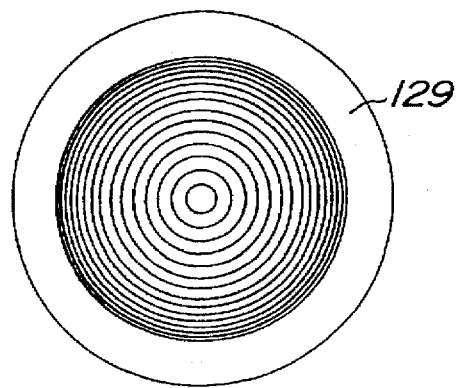

FIG_41 PRIOR ART
----- auxiliary light
——— visible light
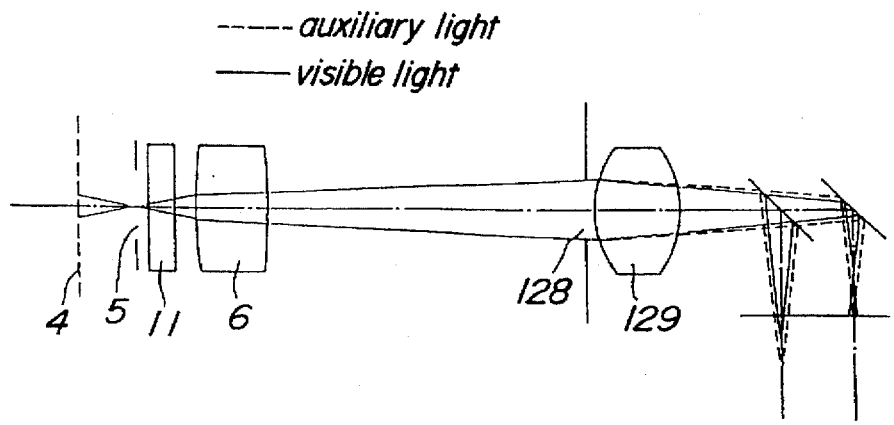
FIG_42
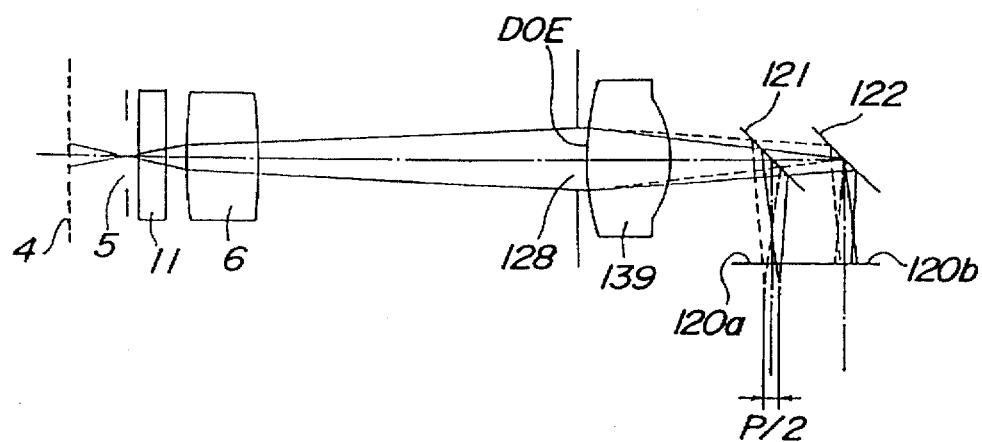
FIG_43
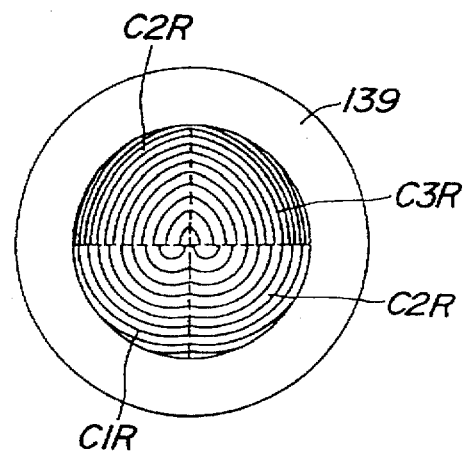

FOCUS DETECTING OPTICAL SYSTEM

BACKGROUND OF THE INVENTION

1. Field of the Invention

The present invention relates to a focus detecting optical system, and more particularly to a focus detecting optical system for use in a single lens reflex camera, in which a focus condition of an image of an object formed by an image forming lens is detected.

2. Related Art Statement

There have been various focus detecting devices for detecting a focus condition of a picked-up image in optical instruments such as camera and microscope, and an image pick-up optical system, e.g. objective lens is driven into an in-focused position by using a result of the focus detection. Among these focus detecting devices, there is a focus detecting device, in which a focus is detected by using light fluxes transmitted through different parts of the image pick-up optical system. This type of the focus detecting device has been widely used in practice, because there is no parallax regardless of a distance from the camera to an object, any manufacturing error of the objective lens and any error in a movement of the objective lens toward an in-focused position can be corrected, and a precision of the focus detection can be attained even if the objective lens is exchanged as long as a part of a light flux emanating from the objective lens is made incident upon the focus detecting device. In particular, such a focus detecting device has been predominantly used in a single-lens reflex camera.

A method of detecting a focus condition by using a light flux transmitted through at least a part of the objective lens can be roughly classified into the following two methods:

(1) Phase Difference Method: Two light fluxes transmitted through different portions of the objective lens are focused by a pair of image reforming lenses to form two images and focus is detected by estimating a difference in a distribution of light intensity of these images. This method is based on the fact that a distance between the two images is changed in accordance with the focus condition.

(2) Contrast Method: A contrast of an image formed by a light flux transmitted through the objective lens is estimated and a position of the objective lens at which a maximum contrast can be attained is detected as an in-focus position.

At first, the phase difference method will be explained with reference to FIG. 1. As illustrated in FIG. 1, a condenser lens 6 is arranged near a primary or predetermined image plane (predetermined focal plane, film conjugate plate) 4 of an image formed by an objective lens 1, a pair of image reforming lenses 9a and 9b are arranged behind the condenser lens 6, said image reforming lenses being separated from each other by such a distance that a desired precision of focus detection can be attained, and photoelectric converting element arrays 10a and 10b arranged at a focus position of light fluxes emanating from the image reforming lenses 9a and 9b.

When the objective lens 1 is in an in-focused position, an image I of an object is formed on the predetermined focal plane 4 and first and second images $I_{o1}$ and $I_{o2}$ of this image I are formed by the image reforming lenses 9a and 9b on a secondary focal plane which is perpendicular to an optical axis of the objective lens 1 and on which the array of photoelectric converting elements 12 is arranged. However, when the objective lens 1 is at such a position that an image F of the same object is formed at a plane in front of the predetermined focal plane 4, first and second images $F_{o1}$ and $F_{o2}$ are formed on a plane which is perpendicular to the optical axis and closer to the condenser lens 6 such that the first and second images $F_{o1}$ and $F_{o2}$ come closer to each other. This condition is generally called a forwardly de-focused condition. When an image B of the object is formed on a plane behind the condenser lens 6, first and second images $B_{o1}$ and $B_{o2}$ are formed on a plane behind the predetermined focal plane such that these images are separated from each other in a direction perpendicular to the optical axis. This condition is called a backwardly de-focused condition. All the first images $I_{o1}$, $F_{o1}$ and $B_{o1}$ are directed upwards and all the second images are directed downwards. In the phase difference method, distribution patterns of light intensity of the first and second images on the photoelectric converting element arrays 10a and 10b are compared with each other and a focus position is detected by a result of this comparison. Focus detecting optical systems in accordance with the above mentioned phase difference method have been proposed in, for instance Japanese Patent Application Laid-open Publications Kokai Sho Nos. 55-118019, 58-106511 and 60-32012.

Next, the contrast method will be explained with reference to FIGS. 2A and 2B. In FIGS. 2A and 2B, a condenser lens 6 is arranged in a vicinity of a predetermined focal plane 4 of an objective lens 1 and an image reforming lens 13 is arranged behind the condenser lens 6 to reconstruct an image on an array of photoelectric converting elements 14 which is arranged at a conjugate position with the predetermined focal plane 4 with respect to the image reforming lens 13. FIG. 2A depicts an in-focused condition, in which a light flux transmitted through the objective lens 1 is focused on the predetermined focal plane 4. FIG. 2B shows a forwardly de-focused condition in which an focused image of the object is formed at a position before the predetermined focal plane 4. In the in-focused condition, a sharp image of the object is formed on the array of photoelectric converting elements 14, so that the image has a high contrast. In the forwardly de-focused condition illustrated in FIG. 2B, the de-focused image is formed on the array of the photoelectric converting elements 14 and thus a contrast is low. Therefore, by moving the objective lens 1 in such a direction that a contrast of the image formed on the array of photoelectric converting elements 14 is increased, the objective lens can be driven into the in-focused position. In Japanese Patent Application Laid-open Publication Kokai Sho 63-127217, there is described that images are formed by a light flux transmitted through the objective lens 1 at positions before and after the predetermined focal plane 4, contrasts of these images are detected, and a focus condition is detected by comparing the thus detected contrasts of the two images. Further, the focal condition may be detected by moving the image reforming lens 13 along the optical axis.

In Japanese Patent Application Laid-open Publication Kokai Sho 62-3215, there is disclosed another known focus condition detecting optical system comprising a condenser lens arranged in a vicinity of a predetermined focal plane of an objective lens, a pair of aperture stops arranged side by side with a distance required for attaining a necessary focus direction accuracy, and a pair of photoelectric converting element arrays each corresponding to respective aperture stops, whereby said pair of photoelectric converting element arrays are arranged in parallel with each other.

In order to mitigate a so-called aliasing effect, Japanese Patent Application Laid-open Publication Kokai Sho 61-255316, there is proposed to apply a low pass function to an output signal of the photoelectric converting element array.

A diffractive optical element (DOE) has been described in "Optics", Vol. 22, pp. 126–130 (Yuzou Ono). Furthermore, an image pick-up optical system using the diffractive optical element has been disclosed in SPIE, 1354 (1990), "Diffractive doublet corrected on-axis at two wavelengths (Michael W. Farn, Joseph W. Goodman)" and "The design of achromatized hybrid diffractive lens systems (Camina Londono, Peter P. Clark)". A similar optical system has been also described in Applied Optics, Vol. 31, No. 13, 1 May 1992, "Modeling diffractive efficiency effects when designing hybrid diffractive lens system (Camina Londono, Peter P. Clark)". Now DOE will be explained briefly. DOE is an optical element operating on the basis of diffractive phenomenon. As illustrated in FIG. 3, diffraction occurs in accordance with the following equation:

$$\sin \theta - \sin \theta' = m \lambda/d \qquad (1)$$

wherein θ is an incident angle, θ' is an exit angle, m is an order of diffraction, λ is a wavelength, and d is a pitch of diffraction gratings.

Japanese Patent Application Laid-open Publication Kokai Sho 61-134716 has proposed an example of a focus detecting optical system utilizing the diffractive phenomenon. In the focus detecting optical system, a light beam is divided into a plurality of harmonics having substantially same intensity by the diffraction. Now a single diffracted light flux is considered. If a pitch d of the diffraction gratings is continuously changed as illustrated in FIG. 4, the diffraction grating can have a lens function for converging diffracted light fluxes. When DOE has a sawtooth cross sectional configuration as shown in FIG. 5 and a height h of triangular protrusions is set to satisfy the following equation (2), an m-order diffracted light flux becomes 100% for incident light having a wavelength λ:

$$h = m\lambda/(n-1) \qquad (2)$$

wherein n is a refractive index of a material of DOE.

DOE having the construction shown in FIG. 5 is called kinoform. Usually the kinoform is simulated by multi-steps as depicted in FIGS. 6A and 6B, and a simulated DOE is called a binary optical element. The binary optical element can be manufactured rather simply by lithography. FIG. 6A illustrates a binary optical element formed by a four-step simulation and FIG. 6B shows a binary optical element formed by an eight-step simulation. It has been found that the four-step simulated binary optical element has a diffraction efficiency of 81%, the eight-step one has a diffraction efficiency of 95% and a sixteen-step simulated binary optical element has a diffraction efficient of 99%. As can be understood from the equation (1), wavelength characteristic of a focal length of a lens composed of DOE is expressed by the following equation (3). When Abbe's number of this lens is calculated, νd=−3.45. This results in a relatively large inverse dispersion.

$$\lambda f(\lambda) = \text{constant} \qquad (3)$$

wherein f(λ) is a focal length of the lens composed of DOE for a wavelength λ.

Furthermore, it has been known that a diffraction efficiency k of a kinoform having 100% diffraction efficiency at a wavelength λ0 may be represented by the following equation (4):

$$k = \sin^2 [\pi(\lambda 0/\lambda - m)]/[\pi(\lambda 0/\lambda - m)]^2 \qquad (4)$$

One of conditions required for the image pick-up system is an easiness of handling. The focus condition detecting faculty has been developed to free a user from focus adjustment, and recently this faculty has been required to improve the handling by the user. That is to say, it has been desired to develop an improved focus detecting apparatus, which can be assembled easily from the smaller number of parts at a low cost, which can be constructed compactly and can be easily carried by the user, which can detect a focus condition for an object situating an arbitrary position in a field of view over a wide range from a proximal point to a remote point with a small number of special conditions under which the focus detection could not be performed, and which can detect a focus condition at a high precision. It has been further desired to develop an image pick-up apparatus having the above mentioned requirements in combination.

As to a position of an object in a field of view whose focus condition has to be detected, it has been proposed to perform the focus detection for discrete areas in the field of view. That is to say, the focus condition of the subject in the field of view can be detected only when the subject is in the predetermined focus detection area or areas in the field of view. Therefore, it has been desired to perform the focus detection under a condition that the subject is at any arbitrary position in the field of view. Such a function is particularly desired when a subject is moving in the field of view. Furthermore, in order to detect a focus condition of a dark subject, it has been proposed to effect the focus detection by projecting infrared light or visible light having a long wavelength in view of a cost and undesired influence upon the subject. Then, the focus detection is carried out at a wavelength which is different from an actual image pick-up, so that the precision of the focus detection is low.

In order to realize the desired functions mentioned above, the focus detecting optical system is liable to be subjected to much more burden due to a layout condition near an optical axis. Then, a compactness of the focus detecting optical system has to be attained by shortening the whole length of the optical system and integrating a photoelectric converting device, and other functions such as wideness of field of view, precision of the focus detection, and easiness of manufacture have to be realized in a highly balanced manner.

The focus detecting apparatus on the basis of the phase difference method has the following problems.

At first, problems due to the condenser lens will be explained.

The function of the condenser lens is to project an entrance pupil of the focus detecting optical system which is preferably identical with the exit pupil of the image pick-up lens.

(1) In order to realize the compactness, it is absolutely necessary to decrease a distance between the condenser lens and the aperture stop. To this end, it is necessary to increase a power of the condenser lens.

(2) In order to widen a field of view, it is necessary to increase an effective area of the condenser lens.

The above mentioned conditions (1) and (2) result in the same problem in view of a fact that the power of the condenser lens is increased. If the power of the condenser lens is increased with respect to an effective diameter of the condenser lens, the following problems will arise:

When the power is increased while the effective diameter is made constant, aberrations would be increased and at last no light transmitted. When a power of a lens surface opposing to the predetermined focal plane is increased, its radius of curvature is decreased. That is, when the power of the lens becomes large, the peripheral surface area of the lens becomes remote from the predetermined focal plane, so that the effective lens diameter is liable to be increased. In order to mitigate such a drawback, it is considered that the power of the lens surface opposing to the predetermined focal plane is decreased with respect to the power of the other lens surface. However, this measure could not reduce the diameter of the lens sufficiently. Moreover, an effective lens diameter may be reduced by utilizing spherical lens, but this measure could not fully solve the above problem, because also in a convex spherical lens, a lens surface opposing to an object is departed from the object and a lens surface opposing to the predetermined focal plane is departed from the focal plane in accordance with a distance from an optical axis. Aberrations of the condenser lens is changed due to a decrease in the pupil transferring faculty and on-axis and off-axis, and the focus detection precision might be decreased due to a fact that a relationship between an amount of defocus and a signal from a sensor is reversed between the on-axis and the off-axis.

If the lens power is increased while the effective lens diameter is kept constant, a variation of focal length and chromatic aberration are manifest. When the focal length of the condenser lens fluctuates in accordance with the wavelength of the light, NA of the incident light is limited due to the fact that an area of the pupil which can transmit the light varies in accordance with the wavelength. When the chromatic aberration is increased, an angle of incidence of a light flux emanating from the same point with respect to the image reforming lens varies in accordance with the wavelength, so that a relationship between the sensor output and an amount of defocus is changed in accordance with the wavelength. This apparently reduces the precision of focus detection. This problem could be solved by using a condenser lens composed of a plurality of lens elements. But, this solution results in an increase in cost due to an increase in the number of parts and manufacturing process, a reduction in precision due to an increase in error factors, and the whole image pick-up apparatus could not be made compact due to the fact that the condenser lens is liable to be large in size, so that a space within a body of the image pick-up apparatus could not be utilized efficiently due to the fact that an optical axis of the focus detecting optical system could not be folded by using, for instance a mirror.

Next causes for decreasing the precision and faculty due to the aperture stop will be explained.

The function of the aperture stop is to divide the entrance pupil of the focus detecting optical system set by conditions of the image pick-up lens and thus divided plural light fluxes are transferred to the image reforming lenses. In order to attain the desired compactness by increasing the power of the condenser lens and by arranging the aperture stop closer to the primary focal plane, then a reduction ratio with respect to the entrance pupil becomes large and a size of the aperture stop becomes small as a whole. When the aperture stop becomes small as a whole, the following problems arise. At first, absolute values of allowable ranges for precision of shape and position become small, assembling of parts will be difficult, the precision is decreased, and cost is increased. The aperture stop has been manufactured by forming apertures in a thin metal plane. Furthermore, a precision of positioning to a frame of the aperture stop can be performed by holes or recesses formed in said metal plate. In this manner, it is necessary to form a number of apertures and recesses in the thin metal plate. When a distance between adjacent apertures or recesses becomes small, a mechanical strength of the thin metal plate is decreased, and thus the precision of the aperture stop is also decreased. In order to increase a distance between adjacent apertures, an area ratio of the aperture with respect to the entrance pupil is decreased and an amount of light impinging upon the photodetector is also reduced. When an amount of light impinging upon the photodetector is decreased, a focus condition of a dark object could not be detected and the precision of the focus detection is decreased do to a decrease in S of S/N. It has been proposed to form the aperture stop on a glass plate by printing, but then it is difficult to secure the glass plate to a frame at a low cost.

Next reduction in precision and faculty due to the image reforming lens will be explained.

Function of the image reforming lenses is to guide the light fluxes transmitted through the aperture stop into respective light receiving element arrays.

(1) When the aperture stop becomes small, the image reforming lens becomes also small.

(2) If a size of the light receiving element arrays is large, the light fluxes transmitted through respective apertures of the aperture stop have to be guided into different positions.

(3) In order to decrease a distance between the aperture stop and the light receiving element arrays, it is necessary to increase a power of the image reforming lenses.

(1) When the image reforming lenses become small as a whole, the following problems arise.

Absolute values of allowances for shape and position become small when the image reforming lenses become small, and thus the working of parts and assembling become difficult. This results in decrease in precision and an increase in cost. Particularly, a distance between successive image reforming lenses and a positional relationship between the apertures and the image reforming lenses are important factors for attaining the high precision of the focus detection. The positional relationship between the aperture stops and the image reforming lenses depend on a positional relationship between the image reforming lenses and a holding member for the aperture stop, a positional relationship between the holding member for the aperture stop and a plate of the aperture stop, and a positional relationship of the apertures in the plate. It would be possible to mitigate some of the above mentioned positional relationships by adjustments, but cost will be increased by the adjustments. It should be noted that these adjustments are carried out by taking apexes of the image reforming lenses as reference point. The apex of the image reforming lens has to be measured three-dimensionally and it would be quite difficult to measure the apex of the image reforming lens accurately. This results in that the parts could not be manufactured precisely and could not be assembled accurately, and the precision is decreased and the cost is increased.

Moreover, when the image reforming lenses become small as a whole, a distance between successive image reforming lenses becomes short. For instance, when the image reforming lenses are formed by a plastic mold, it is required to provide an area which is continuous from an effective area of an image reforming lens in order that a shrinkage of a molded lens can be compensated for. In other words, it is necessary to provide a much wider effective lens surface area. However, such a wider effective lens surface area could not be obtained when the image reforming lens becomes large as a whole. This problem occurs also in a case of manufacturing the image reforming lenses by a press. Mechanical cutting and polishing do not require a wide effective lens surface area beyond the effective lens surface, but mechanical cutting and polishing could manufacture only a spherical lens surface accurately with a high cost.

(2) In order to guide the light fluxes transmitted through respective apertures into different positions which are sufficiently separated from each other, the following problems will occur.

First of all, it is required to bend the light flux impinging upon the image reforming lens at a large angle, so that aberrations occur. Particularly, aberrations causing a change in magnification such as distortion of image change a relationship between the sensor output and a defocus amount depending upon on-axis and off-axis, so that the precision of the focus detection is decreased.

Moreover, when the light flux impinging upon the image reforming lens is bent largely, chromatic aberration is increased due to a function of a prism. This causes a change in the relationship between the sensor output and the defocus amount. It is theoretically possible to cancel the chromatic aberration by the condenser lens and the image reforming lens. However, an amount of the chromatic aberration is determined substantially by the near-axis layout of the condenser lens and image reforming lens, so that there is a little possibility that the chromatic aberrations are cancelled by the condenser lens and image reforming lens under a condition that a compact near-axis layout can be manufactured at a low cost.

(3) When the power of the image reforming lens is increased, the following problems will occur:

When the power is increased without increasing the number of lens elements, the aberrations are increased. Particularly, aberrations such as distortion of image causing a change in magnification decrease a precision of focus detection, because they change a relationship between the sensor output and the defocus amount in accordance with the on-axis and off-axis, and therefore the precision of focus detection is decreased. When use is made of the above explained auxiliary light, the same problem arises.

Further, when a distance between the aperture stop and the light receiving element arrays is shortened for the light receiving element arrays having the same size, it is required to bend largely the light flux impinging upon the image reforming lens, which causes an increase in chromatic aberration due to the function of prism. This results in a change in a relationship between the sensor output and the defocus amount, and thus the focus condition could not be detected accurately. This is also the case in which the auxiliary light is used.

Next problems due to a layout of the light receiving element arrays will be explained.

Function of the light receiving element array is to receive a light flux transmitted through an aperture stop and a corresponding image reforming lens to derive an output representing a distribution of an intensity of light.

(1) A length of a light receiving element array is prolonged in accordance with an increase in a width of a field of view over which a focus detection has to be performed.

(2) The number of light receiving elements is increased for increasing a precision of focus detection and a length of array is increased. If a pitch of array of light receiving elements is shortened, an amount of received light is decreased and a precision under a low brightness is decreased.

(3) It is necessary to take a mutual alignment for the field stop arranged near the primary focal plane, image reforming lenses and light receiving element arrays such that respective light receiving elements can receive light fluxes transmitted through corresponding apertures of the aperture stop.

The above mentioned problems (1) and (2) cause an increase in a length of the light receiving element array. Then, this results in an increase in a size of a substrate on which the light receiving element arrays are arranged and it is no more possible to manufacture a compact focus detecting optical system. Further, the light flux impinging upon the image reforming lens has to be bent largely, so that the above mentioned problems arise. When the light receiving element arrays are formed on a semiconductor substrate having a large size, an efficiency of manufacturing the light receiving element arrays is decreased and a cost of the focus detecting optical system is increased. In almost all phase difference type focus detecting optical systems, a plurality of light receiving element arrays are formed rectilinearly, but it has been also proposed to arrange them in parallel with each other. This can solve the above problem, but this results in a generation of asymmetrical aberrations in a direction perpendicular to a longitudinal direction of the array of light receiving elements. This causes a serious degradation in a focus detection accuracy at a central portion of a field of view which is most important. For instance, when use is made of a prism for deflecting the light flux in the direction perpendicular to the array of light receiving elements, optical path lengths of a pair of light fluxes emanating from the same point on the predetermined focal plane differ from each other, and this causes an error in a detection of a distance to an object.

In known focus condition detecting systems, the image reforming lens is not required to have a function for bending the light flux in the direction perpendicular to the array of light receiving elements, and there a some allowance in a deviation of the whole system in the direction of the array of light receiving elements, because such a deviation could be removed by performing a correction for the output signal from the light receiving element array. However, when the light receiving element arrays are arranged in parallel with each other, the image reforming lenses are required to bend the light fluxes in the direction perpendicular to the direction in which light receiving elements are aligned, and thus the deviation of the whole optical system in the direction perpendicular to the direction in which light receiving elements are aligned could not be corrected by processing the output signal from the light receiving element arrays. This is due to the fact that information of a distribution of light intensity is lost as a whole. In this manner, when the light receiving element arrays are arranged in parallel with each other, parts of the focus detecting optical system have to be manufactured and assembled in a very precise manner and cost is liable to be increased.

When the primary focal plane is provided within the mirror box in order to make the mirror box compact and decrease a flare, it is impossible to arrange the field stop on the primary focal plane. Then, an in-focused image of the field stop is not formed on the light receiving element array.

When the field stop is arranged at a position remote from the primary focal plane, a large field stop is required in order to maintain a light flux impinging upon the light receiving element array. On the other hand, in order not to make incident the light flux emanating from an aperture upon a non-corresponding light receiving element array, it is necessary to arrange the light receiving element arrays much more separately form each other than a case in which the field stop is arrange on the primary focal plane. This is disadvantageous in points of a semiconductor chip and assembling of image reforming lenses.

Now causes for decreasing the precision and function due to characteristics of the light receiving element array will be explained.

The light receiving element array is formed by arranging side by side a plurality of light receiving elements having substantially the same shape. A spatial frequency component of the image above a Nyquist frequency $f_N=1/(2\ p)$ might cause so-called moire, which decreases the precision of the focus detection, where p is a pitch at which light receiving elements are arranged on the array. This has been explained in detail in Japanese Patent Application Publication No. 5-54042. It has been proposed to arrange the light receiving element arrays being shifted from a conjugate plane with the primary focal plane to suppress the Nyquist frequency component or to correct the output signals from the light receiving element arrays in an electronically to substantially null the influence of the Nyquist frequency component. In a former solution, there is a problem that a frequency component which is near the Nyquist frequency and is effective for the focus detection is also weakened. In a latter solution, the information of distribution of light intensity could not be utilized effectively by processing the output signals of the light receiving element arrays. Furthermore, in the former solution, the Nyquist frequency might appear in the in-focused condition and the spatial frequency component effective for the focus detection might be lost, so that an amount of the detectable defocus is restricted.

SUMMARY OF THE INVENTION

The present invention has for its object to provide a novel and useful focus detecting optical system, in which various factors such as the shortening of a whole length of the optical system, integration of light receiving element arrays, widening of field of view, precision of focus detection, the number of parts, and fabrication can be highly balanced.

The focus detecting optical system of the contrast method and the focus detecting optical system of the phase difference method belong basically to the image reforming optical system. Therefore, except for the problems concerning the image reforming lens for dividing the pupil and aperture stop, the focus detecting optical system of the contrast method has the same problems of the focus detecting optical system of the phase difference method.

Objects of the present invention may be summarized as follows:

(1) To provide a compact focus detecting optical system having a wide field of view.
(2) To provide a compact focus detecting optical system having a high precision.
(3) To provide a focus detecting optical system, in which moire is scarcely produced and defocus information can be attained easily.
(4) To provide a focus detecting optical system, in which a photosensor can be highly integrated and a distance to an object can be measured precisely.
(5) To provide a focus detecting optical system, in which moire is scarcely produced, and the system can be compact, a photosensor can be highly integrated and a distance to an object can be measured precisely in regardless of a positional relationship between a predetermined focal plane of an image forming lens and a field stop.

According to the invention, various factors can be highly balanced by realizing one or more of the above mentioned objects.

According to a first aspect of the present invention, a focus detecting optical system for detecting a focus condition of an image of an object comprises:

a focus detecting optical means for reforming an image of an object formed on a first predetermined focal plane by an image forming optical system on a second focal plane; and a diffractive optical means having at least one optical function and arranged between said first predetermined focal plane and said second predetermined focal plane.

In a preferable embodiment of the focus detecting optical system according to the invention, said diffractive optical means is constructed to have a lens function, and said focus detecting optical means comprises a condenser lens arranged in a vicinity of said first predetermined focal plane of the image forming optical system, an aperture stop arranged to act upon a light flux emanating from the condenser lens, one or more image reforming lenses for converging a light flux transmitted through the aperture stop, and a photoelectric converting means for receiving one or more light fluxes emanating from said one or more image reforming lenses. Said diffractive optical means includes at least one diffractive optical element formed in a surface of the condenser lens opposing to the image pick-up optical system, a surface of the condenser lens opposing to the photoelectric converting means, a surface of the image reforming lens opposing to the image forming optical system or a surface of the image reforming lens opposing to the photoelectric converting means. When the focus detecting optical system includes an infrared cut filter, said diffractive optical element may be formed in one of surfaces of this filter. As will be made clear in the detailed description below, the diffractive optical element can be formed to comprise a surface having a diffraction grating whose pitch is continuously changed in an area in which a light flux having an optical axis is made incident. For example, the diffractive optical element can have a lens function.

Now the operation of the first aspect of the present invention will be explained with reference to a case in which the focus detecting optical system is applied to the phase difference method.

Now it is assumed that at least one surface of the condenser lens is formed by the diffractive optical element (DOE). DOE can give a plane parallel plate a lens function. Such a plane parallel plate having DOE formed in its surface is called a plate lens. When a surface of the condenser lens opposing to the image forming lens is constituted as a plate lens plane, it is possible to form the lens surface at substantially identical distance with respect to an entrance pupil of the focus detecting optical system. When a surface of the condenser lens opposing to the photoelectric converting means is formed by DOE, the lens plane can be formed at substantially identical distance from a plane on which an aperture stop is arranged regardless of a height from the optical axis. Upon comparing a refractive type lens and the plate lens formed by DOE having the same power, in the refractive type lens, an incident height of a light ray having a larger incident angle with respect to the optical axis becomes larger. Then, in the refractive lens, there are produced large aberrations, and thus an effective lens diameter is smaller than that of the plate lens (refer to a first embodiment).

According to the invention, when one surface of the condenser lens is formed by DOE having a lens function, it is possible to provide a compact focus detecting optical system having a continuous wide field of view, in which a condenser lens having a relatively high power and producing small aberrations can be attained without increasing the number of lens elements, so that an optical path length from the first predetermined focal plane to the aperture stop can be shortened.

It should be noted that according to the invention, when the condenser lens is formed by DOE, DOE may be formed in any one or both of the surfaces of the condenser lens. A focal length of DOE formed in a surface of the condenser lens may be substantially identical over a whole surface area or may be continuously or discontinuously changed in accordance with positions on the whole surface area in order to improve a whole optical property of the focus detecting optical system.

In a preferable embodiment of the focus detecting optical system according to the invention, said condenser lens having DOE formed in the surface thereof is constructed to satisfy the following condition:

$$0.2 < D/fc < 2.5 \tag{5}$$

wherein D is a maximum effective diameter of the condenser lens and fc is a focal length of the condenser lens. The maximum effective diameter of the condenser lens should be interpreted to mean twice a length from an optical axis to a most remote point in an effective area. For instance, when the effective area of the condenser lens is rectangular, the maximum effective diameter is a length of a diagonal.

If D/fc becomes equal to or smaller than 0.2, it is no more necessary to use DOE. However, DOE may be utilized in order to confirm the assembling and adjustment of parts by inspecting a shape of diffractive gratings. IF D/fc becomes equal to or larger than the upper limit of 2.5, although DOE is used, the condenser lens might be subjected to a large load. According to the invention, it is particularly preferable to make D/fc to be equal to or smaller than 1.5. Then, an allowance in error in fabrication of DOE becomes small.

According to the invention, it is possible to provide a cheap focus detecting optical system which does not require an infrared cut filter or does require a simple or lower grade infrared cut filter having a simple construction of deposited films by setting a peak wavelength of the spectral diffraction efficiency to a wavelength within the visible range. Now the peak wavelength of the spectral diffraction efficiency is termed as Maxλ, Maxλ is preferably determined by considering spectral characteristics of the photoelectric converting means and image forming optical system. In an image pick-up device for picking-up a usual visible light image, Maxλ is preferably determined to satisfy the following condition:

$$400 \text{ nm} < Max\lambda < 550 \text{ nm} \tag{6}$$

If Maxλ is set to be equal to or smaller than 400 nm, it is no more possible to make a visible light flux subjected to a lens function sufficiently. If Maxλ is set to be equal to or larger than 550 nm, a diffraction efficiency for infrared light becomes too high. It should be noted that when undesired infrared light is cut by the infrared cut filter, the upper limit in the above condition (6) may be increased to 650 nm. If Maxλ is set to be equal to or larger than 650 nm, the visible light flux could not be subjected to the lens function sufficiently.

In an image pick-up device using auxiliary light composed of red light or infrared light, DOE may be constituted to have plural regions having peak wavelengths of spectral diffraction efficiency in a visible region and in an infrared region. These regions of DOE may be formed on a single plane or on different planes. For instance, one region may be formed on one surface of the condenser lens and the other region may be formed on the other surface of the condenser lens. Alternatively, one region may be formed on one surface of the condenser lens and the other region may be formed on one surface of an infrared cut filter. Then, a visible light flux used for the usual image pick-up is subjected to the lens function of the DOE region having the peak wavelength within the visible range, and an infrared light flux of the auxiliary light is subjected to the lens function of the DOE region having the peak wavelength within the infrared range. By determining the lens function of the DOE region having the peak wavelength within the infrared range by considering chromatic aberrations of the image pick-up lens and optical elements of the focus detecting optical system, a precision of the focus detection by using the auxiliary light can be improved. In this case, the peak wavelength of DOE regions preferably satisfy the following condition:

$$200 \text{ nm} < Max\lambda_R - Max\lambda_G < 800 \text{ nm} \tag{7}$$

wherein $Max\lambda_R$ is a peak wavelength of the spectral diffraction efficiency of the DOE region for the longer wavelength light and $Max\lambda_G$ is a peak wavelength of the spectral diffraction efficiency of the DOE region for the visible light.

If $Max\lambda_R - Max\lambda_G$ becomes equal to or smaller than the lower limit of 200 nm, it is disadvantageous that a large amount of light is diffracted by both DOEs. If $Max\lambda_R - Max\lambda_G$ becomes equal to or larger than 800 nm, a light flux having wavelengths between $Max\lambda_R$ and $Max\lambda_G$ and being not diffracted becomes large. Therefore, it is particularly preferable to set the upper limit to 400 nm, because an amount of light which is not diffracted by DOEs becomes smaller. However, when the refractive type lens function is designed only for a middle wavelength range, correction for shorter wavelength range light is performed by one of DOEs, and correction for longer wavelength light is carried out by the other DOE, the upper limit may be set to 800 nm. However, in this case, the upper limit is preferably set to 400 nm, because then a range of light which are not diffracted by both DOEs is widened. In a preferable embodiment of the focus detecting optical system according to the invention, it is desired to satisfy the following condition:

$$-500 \text{ nm} < Max\lambda_R - Max\lambda_S < 500 \text{ nm} \tag{8}$$

wherein $Max\lambda_R$ is a peak wavelength of the spectral diffraction efficiency of DOE for longer wavelength light and $Max\lambda_S$ is a peak wavelength of the spectral diffraction efficiency for the auxiliary light an average wavelength of the auxiliary light.

If $Max\lambda_R - Max\lambda_S$ becomes equal to or larger than the upper limit of 500 nm, the auxiliary light is not sufficiently subjected to the lens function by DOE destined for the longer wavelength light. When the upper limit is set to 300 nm, the diffraction efficiency for the auxiliary light is not so decreased and the diffraction efficiency for visible light other than the auxiliary light can be preferably made small. Further if the upper limit is set to 100 nm, the diffraction efficiency is preferably increased. If the $Max\lambda_R - Max\lambda_S$ becomes equal to or smaller than the lower limit of −500 nm, it becomes impossible to provide sufficiently the lens function for the auxiliary light by DOE for the longer wavelength light. If $Max\lambda_R - Max\lambda_S$ becomes larger than −300 nm, an influence for the auxiliary light becomes much stronger than that for the visible light other than the auxiliary light. Furthermore, if the lower limit is set to −100 nm, the diffraction coefficiency becomes preferably increased. If the lower limit is set to 100 nm, the diffraction efficiency for the visible light other than the auxiliary light becomes preferably reduced, while the diffraction efficiency for the auxiliary light is not substantially decreased. If the lower limit is set to 300 nm, the diffraction efficiency for the visible light becomes substantially zero, but the diffraction efficiency for the auxiliary light is not reduced so much.

DOE surface has a negative dispersion. When the condenser lens is composed of DOE surface and refractive lens surface, it is possible to constitute various lenses by suitably combining the power of DOE surface and the power of the refractive lens surface, e.g. a lens having no power fluctuation in accordance with the wavelength or a lens having a power which changes largely in accordance with the wavelength. In a condenser lens having only the refractive surfaces, the fluctuation of the power in accordance with the wavelength is small. That is to say, according to the present invention, the entrance pupil of the focus detecting optical system can be transferred efficiently and a larger amount of light can be taken out of the image pick-up lens by using the condenser lens composed by considering chromatic aberrations of the image pick-up lens and a whole construction of the focus detecting optical system. Moreover, by arranging the condenser lens remote from the predetermined focal plane, it is possible to detect the focus condition precisely although the spectral sensitivity of the light source and object to be picked-up is changed.

The light flux impinging upon the light receiving element array is transmitted through the image forming lens, half mirror for dividing the light flux into the focus detecting optical system and finder optical system, and the optical elements of the focus detecting optical system. Contrary to this, the light flux impinging upon the image pick-up plane such as a film plane is transmitted only through the image pick-up lens. Moreover, spectral sensitivity characteristics of the image pick-up plane and the light receiving elements are different from each other. In order to mitigate this difference, there is usually arranged an infrared cut filter in the focus detecting optical system. According to the invention, the spectral sensitivity of the focus detecting optical system can be matched with that of the image pick-up system by utilizing the wavelength selectivity of DOE. In this case, DOE is formed on the condenser lens or image reforming lens to provide a function of the infrared cut filter. Then, it is no more necessary to provide the infrared cut filter and thus a cost can be decreased. Further, the infrared cut filter may be formed by DOE. In this case, DOE may have the lens function, so that the load of the remaining lenses can be mitigated. It is preferable that DOE is not formed in the surface which is closest to the predetermined focal plane of the image forming lens, because DOE can be effectively prevented from being affected by stains such as oil which might degrade the lens function.

In order to divide the light flux impinging upon DOE into the diffracted light flux and the non-diffracted light flux, the diffracted light flux may be tilted with respect to the entrance light flux or the lens construction is determined by considering the non-diffracted light flux. Moreover, the non-diffracted light flux may be treated as a flare by the light receiving element array. That is, the non-diffracted light flux emanating from a single point is sufficiently expanded on the light receiving element array, so that it does not influence the output of the light receiving element array.

Now the operation of the focus detecting optical system according to the invention applied to the phase difference method, in which at least one surface of the image reforming lens is formed by DOE will be explained.

When DOE surface is formed by the plate lens, there is no step between a lens area and a non-lens area. Therefore, when lens surfaces having different lens functions are formed on a single plane, effective areas of these lens surfaces can be made closer to each other.

According to a second aspect of the present invention, a focus detecting optical system for detecting a focus condition of an image of an object comprises:

a condenser lens arranged in a vicinity of a predetermined focal plane of an image forming optical system;

an aperture stop including a plurality of apertures which are separated from each other by a distance which can guarantee a desired precision of focus detection;

a plurality of image reforming lenses corresponding to said plurality of apertures of the aperture stop and converging light fluxes transmitted through the aperture stop;

a plurality of light receiving element arrays for receiving a plurality of light fluxes emanating from said plurality of image reforming lenses; and a plurality of diffractive optical elements formed in surfaces of said plurality of image reforming lenses.

According to the invention, said diffractive optical element may be formed by the plate lens. Then, effective areas of the plate lenses can be arranged closer to each other. Moreover, a positional relationship of the image reforming lenses can be confirmed with a high precision by measuring a shape of diffractive gratings in a two dimensional manner. In case of using the refractive type image reforming lens, it is necessary to perform the measurement in a three dimensional manner, and an apex of a lens is smooth and could not be measured easily. According to the present invention, upon comparing the refractive type lens, the management of the precision can be easily performed, the effective area of the image reforming lens can be widened without increasing cost, and a larger amount of light can be made incident upon the light receiving element array. Particularly, in order to shorten the optical path length from the predetermined focal plane to the aperture stop, when the power of the condenser lens is increased, a reducing magnification of the entrance pupil of the focus detecting optical system is increased, and a relative dimension of the aperture stop is decreased, the apertures of the aperture stop are liable to be closer to each other. However, according to the invention, the effective areas of the image reforming lenses formed by DOEs can be constructed to be closer to each other and a sufficiently large amount of light can be transmitted to the light receiving element arrays.

According to the invention, the image reforming lens formed by DOE may be integrally formed with the aperture stop. A relationship between positions of the apertures of the aperture stop and positions of corresponding image reforming lenses has a large influence upon the precision of focus detection. In known focus detecting optical systems, the positional relationship between the aperture stop and the image reforming lens can be expressed by [positional relationship between the image reforming lens and a holder for the aperture stop]+[a positional relationship between the holder of the aperture stop and a plate of the aperture stop]+[a positional relationship of the apertures within the aperture stop plate]. According to the invention, by constructing the image reforming lenses and aperture stop integrally as a single body, the positional relationship between the apertures of the aperture stop and the image reforming lenses can be represented by [a relationship between the image reforming lenses+apertures of the aperture stop]. Therefore, error factors can be reduced. The image reforming lenses and aperture stop may be integrally formed in various manners. For instance, a light shielding ink may be applied on the image reforming lenses by painting or printing or a light shielding film may be applied on the image reforming lenses. A light shielding member may be provided on the usual refraction type image reforming lenses. However, in this case, light shielding member has to be applied on a curved or discontinuous surface, so that the precision and durability are liable to be decreased and a fabrication become difficult. According to the invention, the lens plate is inherently flat, so that the light shielding member can be applied easily and precisely. When the effective areas of DOEs are arranged close to each other, it is no more necessary to provide the light shielding member. Furthermore, according to the invention, it is not necessary to provide a substrate for the aperture stop. If a this plate is used as the substrate for the aperture stop and apertures are formed close to each other, a problem of a mechanical strength might occur. According to the invention, a substrate for the aperture stop having a sufficient mechanical strength can be used.

In a preferable embodiment of the focus detecting optical system according to the invention, at least surfaces of the image reforming lenses are formed by diffractive optical elements having a deflecting function. As described above, in the diffractive optical element having the deflecting function, a refractive power becomes large in accordance with an increase in a wavelength. Contrary to this, in the diffractive optical element having the refractive function, a refractive power is decreased in accordance with an increase in a wavelength. The deflecting function by the refractive function may be realized by a prism function in which a surface is inclined with respect to an optical axis or by the deviating function in which a lens surface is deviated with respect to the aperture stop. In either case, the deflecting function is reduced in accordance with an increase in a wavelength. In DOE, the deflecting function can be obtained by arranging linear diffractive gratings at a constant pitch and the lens function or refractive function can be obtained by arranging concentric diffractive gratings at a variable pitch viewed in a radial direction. When a center of the concentric diffractive gratings is shifted with respect to a center of the aperture stop, there is obtained the deflecting function. These two deflecting functions become large in accordance with an increase in a wavelength. That is, by suitably combining these two deflecting functions, it is possible to adjust or control the chromatic aberration. In the known focus detecting optical system, the chromatic aberration can be also controlled by the deviation of the lens due to the refractive function and the prism function. However, a freedom of control of an entrance point of light having a reference wavelength upon the light receiving element arrays is lost, and thus it is difficult to attain a distance between the two images when the optical length of the whole focus detecting optical system is shortened. According to the present invention, by combining the refractive function and diffractive function, a distance between the two images can be attained while an optical path length of the focus detecting optical system can be easily shortened.

When the object to be picked-up has a low brightness or contrast, it has been proposed to illuminate the object with an auxiliary light or a pattern in order to increase the brightness or contrast of the object. Usually the auxiliary light is composed of long wavelength light (red light) in the visible range or of infrared light owing to the reason that a light source emitting such light is easily available and the object (human being) does not feel glare. When DOE is used in the focus detecting optical system, the function of DOE has a wavelength dependency, so that for a wavelength which is far from a peak wavelength, a large amount of light is not subjected to the function of DOE, and finally light is not subjected to the function of DOE at all. Usually when a peak wavelength of DOE is set to a value within a visible light range of 400 nm to 600 nm, light within the whole visible range is subjected to the function of DOE. When the peak wavelength of DOE is set to a value higher than 800 nm, only the infrared light is subjected to the function of DOE, but visible light, particularly a shorter wavelength light is no more subjected to the function of DOE.

In order to use the auxiliary light, it is necessary to use light receiving elements which are sensitive to the auxiliary light. In general, the chromatic aberration of the image pick-up lens for a wavelength exceeding the visible range becomes large abruptly. A spectral sensitivity of the light receiving element for such a wavelength is substantially same as that for the visible wavelength, and therefore the generation of the chromatic aberration does not cause any problem. However, in the focus detecting optical system, the generation of the chromatic aberration might cause a serious problem. Particularly, an image of the object illuminated by the visible light and an image of the object irradiated with the auxiliary light are formed at different positions on the predetermined focal plane, and this could be hardly corrected. In a preferable embodiment of the focus detecting optical system according to the invention, a peak wavelength of DOE constituting a portion of the focus detecting optical system is set to a wavelength longer than the visible light wavelength. Then, a distance between the two images formed by the auxiliary light can be substantially identical with that by the visible light. In this case, DOE area may be formed in a whole area of a lens surface or in a part thereof. Further, a plurality of DOE regions having different peak wavelengths may be formed. Moreover, the visible light and infrared light may be separated by DOE. In this case, the light receiving element arrays may be used commonly for the visible light and infrared light or separate light receiving element arrays may be used for the visible light and infrared light.

In the phase difference method as well as in the contrast method, if a high frequency component is made incident upon the light receiving element array, there is produced a so-called moire which might introduce an error in measurement of a distance to an object. In a preferable embodiment of the focus detecting optical system according to the invention which can avoid the above mentioned drawback, at least one surface of the optical system is formed by DOE which is constructed to have two focal points aligning in a direction in which light receiving elements are arranged side by side. Further, another focal points may be existent continuously or discontinuously between said two focal points. In this case, it is preferable to satisfy the following condition:

$$0.5*p<w<p \tag{9}$$

wherein p is a pitch of the light receiving elements and w is a continuous or discontinuous width of a portion of the light receiving element array measured in a direction along which the light receiving elements are aligned, a light flux emanating from a point at which the predetermined focal plane of the image forming lens and the optical axis are crossed with each other and transmitted through the aperture stop being made incident upon said portion on the light receiving element array. It is preferable to form DOE in a surface of the image reforming lens. In general, the image reforming lenses are arranged near the aperture stop as compared with the condenser lens, so that the image information can be easily divided by the image reforming lenses into the two focal points. In other words, a lens element near the predetermined focal plane of the image pick-up lens could hardly change the focal point. It is preferable to constitute DOE by a multiple-focal point optical element consisting of a plurality of regions having different focal points. The image information could be divided into the two focal points while +1-order diffracted light flux and −1-order diffracted light flux have substantially identical diffraction efficiencies. However, it is preferable to use the multiple-focal point optical element consisting of plural regions having different focal points, because in this case, it is possible to estimate the focus detecting optical system by measuring a two-dimensional configuration of diffractive gratings.

In a preferable embodiment of the focus detecting optical system according to the first aspect of the present invention applied to the phase difference method, one surface of an image reforming lens is formed by a lens function surface and the other surface of the image reforming lens is formed by DOE having the deflecting function viewed in a direction perpendicular to a direction along which the light receiving element arrays are arranged. In this construction, a difference in optical path lengths of light fluxes impinging upon the light receiving element arrays can be substantially identical with a difference in a case in which the deflecting planes are not provided. That is, in the preferable embodiment, the light receiving element arrays can be integrated, while an asymmetrical deviation of images in the direction perpendicular to the direction in which the light receiving element arrays are arranged is hardly produced, so that the focus detecting faculty is hardly deteriorated.

According to a second aspect of the present invention, a focus detecting optical system for detecting a focus condition of an image of an object comprises:

a condenser lens arranged in a vicinity of a predetermined focal plane of an image forming optical system;

an aperture stop including at least one pair of apertures which are separated from each other by a distance which can guarantee a desired precision of focus detection;

at least one pair of image reforming lenses corresponding to said at least one pair of apertures of the aperture stop and converging light fluxes transmitted through the aperture stop;

at least one pair of light receiving element arrays for receiving at least one pair of light fluxes emanating from said at least one pair of image reforming lenses, said light receiving element arrays being arranged in parallel with each other; and a field stop means for restricting a field of view in a direction perpendicular to a direction in which light receiving elements of said light receiving element arrays are aligned; wherein the focus detecting optical system has a first focal length viewed in a plane parallel with the direction in which light receiving elements are aligned and a second focal length viewed in a plane perpendicular to the direction in which light receiving elements are aligned, said first and second focal lengths being different from each other, and viewed in a cross section extending in the direction perpendicular to said direction in which the light receiving element arrays are aligned, a plane at which said field stop means is arranged and a plane in which said light receiving element arrays are arranged are constructed to be substantially conjugate with each other.

Now the function of the focus detecting optical system according to the above mentioned second aspect of the present invention will be explained on a cross section perpendicular to the direction in which light receiving elements are aligned. A light flux transmitted through the image forming lens and focused on the primary focal plane is restricted by the field stop. Then the light flux is transmitted through the condenser lens and is made incident upon the aperture stop having a plurality of apertures. The condenser lens, field stop and aperture stop may be arranged in this order viewed from the primary focal plane or the condenser lens and aperture stop may be formed integrally as a single body. In this manner, light fluxes passing through the apertures of the aperture stop are made incident upon the light receiving element arrays which are arranged separately from each other in the direction perpendicular to the direction in which the light receiving elements are aligned. According to the invention, the field stop and light receiving element arrays are arranged in a conjugate relationship or substantially in a conjugate relationship, and thus even if the light receiving element arrays are arranged closer to each other, the light fluxes can be made incident upon corresponding light receiving element arrays and are not made incident upon non-corresponding light receiving element arrays.

The operation of this construction will be explained on a cross section in the direction in which the light receiving elements are aligned. A light flux transmitted through the image forming lens is made incident upon the condenser lens and then is made incident upon the aperture stop having a plurality of apertures. Light fluxes transmitted through these apertures are subjected to the lens function and deflecting function and are made incident upon corresponding light receiving element arrays. In this case, the predetermined focal plane of the image forming lens and the light receiving element arrays are arranged to be conjugate with each other, so that it is possible to obtain a necessary contrast in the in-focused condition. Further, the image focusing relation on said cross section can be attained in accordance with specifications required for particular focus detecting optical systems such as an ability for mitigating a decrease in a precision of the focus detection due to moire. In this construction, focal lengths are different from each other in cross sectional directions, and this may be performed by using a cylindrical lens having a refractive function or a lens having different radii of curvature in the cross sectional directions. Moreover, DOE may be formed by parallel linear diffractive gratings arranged such that distances between successive diffractive gratings are changed, or by circular (elliptical) diffractive gratings having different pitches in the cross sectional directions. It is preferable to use DOE, because in DOE the focus detecting optical system can be estimated by measuring the arrangement and configuration of diffractive gratings in a two-dimensional manner. Contrary to this, in a refractive lens, the estimation of the lens surface having different radii of curvature in different cross sections can be performed only by measuring all the cross sections in a three-dimensional manner. It is also possible to effect the estimation by means of a spot, but in this case, only a whole lens surface can be estimated, but it is impossible to estimate a place of a defect. Furthermore, the estimation could be performed by comparing the manufactured lens with a standard lens formed as a reference. However, in this case, it is quite difficult to manufacture the standard lens and a lens having a large allowance could not be estimated.

Also in the contrast method, it is preferable to construct the condenser lens and infrared cut filter in the above explained manner. Further, it is advantageous to reduce the number of parts by forming the image reforming lenses and aperture stop together with each other as a single integral body. Moreover, it is effective to provide the two focal points for mitigating the influence of moire. In this case, a plurality of focal points are preferably arranged on the plane perpendicular to the optical axis of the condenser lens. By this measure, contrast at a high point can be easily judged.

According to the invention, it is preferable to construct the diffractive optical element such that a diffraction efficiency of a given wavelength of a single diffraction order exceeds 67% (⅔). Then, an amount of an effective light flux becomes more than twice of an amount of a light flux of undesired diffraction orders. Further, the diffractive optical element is advantageously formed by a kinoform having a saw-tooth configuration. When the diffractive optical element is formed by the kinoform, it is possible to increase the diffraction efficiency. Moreover, the diffractive optical element may be formed by a binary optical element which simulates the saw-tooth configuration of the kinoform by a step configuration. The binary optical element can be easily formed by the lithography and can be estimated easily. It is preferable to use a binary optical element having a four-step configuration. Then, a diffraction efficiency of a given wavelength of a single diffraction order exceeds 67% (⅔). When a binary optical element is formed to have an eight-step configuration, a diffraction efficiency of a given wavelength of a single diffraction order becomes substantially equal to a transmissivity (96%) of a refractive surface having no anti-reflecting coatings. When a binary optical element is formed to have a sixteenth-step configuration, a diffraction efficiency of a given wavelength of a single diffraction order becomes substantially exceeds a transmissivity (96%) of a refractive surface having no anti-reflecting coatings and become substantially equal to a transmissivity of a reflecting surface having anti-reflection coatings. In this manner, a wavelength range having a diffraction efficiency exceeding 67% becomes very wide and covers almost all visible range, while the binary optical element can be manufactured easily.

It is preferable to arrange DOE at such a position that is exposed to the mirror box in order to mitigate a deterioration due to an application of water and oil.

According to the invention, it is preferable to set the number of the diffractive optical elements to a value within a range from 1 to 5.

A diffraction efficiency of DOE has a wavelength dependency and is decreased in accordance with a distance from a peak wavelength. By arranging a plurality of DOEs on a single optical axis, a wavelength dependency is enhanced and a diffraction efficiency is abruptly decreased when a wavelength departs from the peak wavelength. If six DOEs are arranged, a diffraction efficiency at both ends of the visible range is decreased smaller than ⅓, so that according to the invention, the number of DOEs is determined to be from 1 to 5. In case of using three or more than three DOEs, it is preferable to shift peak wavelengths of these DOEs such that a diffraction efficiency becomes more than 50% over a whole visible wavelength range. Further, in case of using less than three DOEs, it is possible to obtain a diffraction efficiency more than 50% over the whole visible wavelength range without shifting the peak wavelength, while a high diffraction efficiency can be attained for a specific wavelength.

BRIEF DESCRIPTION OF THE DRAWINGS

FIG. 1 is a schematic view showing a principle of the phase difference method;

FIGS. 2A and 2B are schematic views illustrating a principle of the contrast method;

FIG. 3 is a schematic view depicting the operation of DOE having a lens function;

FIG. 4 is a schematic view representing the lens function of DOE;

FIG. 5 is a a schematic cross sectional view of a kinoform;

FIGS. 6A and 6B are schematic cross sectional views showing a binary optical element which simulates the kinoform;

FIG. 7 is a schematic view depicting a whole construction of a camera to which a first embodiment of the focus detecting optical system according to the invention is applied;

FIG. 8 is a schematic view showing a basic construction of the first embodiment;

FIG. 9 is a schematic view showing a known focus detecting optical system using refractive elements;

FIG. 15 is a graph representing a spectral diffraction efficiency of DOE;

FIG. 16 is a modification of the second embodiment;

FIG. 17 is a graph expressing a diffraction efficiency of two DOEs arranged one after another;

FIG. 18A is a schematic view showing a third embodiment of the focus detecting optical system according to the invention and FIG. 18B is a schematic view depicting a known focus detecting optical system;

FIG. 20 is a schematic view illustrating a fourth embodiment of the focus detecting optical system according to the invention;

FIG. 21 is a graph representing a spectral diffraction efficiency of DOE of the fourth embodiment;

FIG. 22 is a schematic view showing a fifth embodiment of the focus detecting optical system according to the invention;

FIG. 23 is a plan view of image reforming lenses of the fifth embodiment;

FIG. 25 is a schematic view showing a sixth embodiment of the focus detecting optical system according to the invention;

FIG. 26 is a plan view of image reforming lenses in the sixth embodiment;

FIG. 29 is a plan view showing an entrance position of 0-order light flux;

FIG. 30 is a schematic view depicting a camera including an eighth embodiment of the focus detecting optical system according to the invention;

FIGS. 31A and 31B are schematic views illustrating the eighth embodiment of the focus detecting optical system;

FIGS. 35A and 35B are schematic views showing a tenth embodiment of the focus detecting optical system according to the invention;

FIG. 36 is a plan view illustrating DOEs formed in surfaces of image reforming lenses opposing to light receiving element arrays;

FIG. 37 is a schematic view showing an eleventh embodiment of the focus detecting optical system according to the invention;

FIG. 38 is a plan view depicting DOEs in the eleventh embodiment;

FIG. 39 is a schematic view illustrating a twelfth embodiment of the focus detecting optical system according to the invention;

FIG. 40 is a plan view showing DOEs in the twelfth embodiment;

FIG. 41 is a schematic view depicting a known focus detecting optical system using refractive image reforming lenses;

FIG. 42 is a schematic view showing a thirteenth embodiment of the focus detecting optical system according to the invention; and FIG. 43 is a plan view illustrating DOE of the thirteenth embodiment.

Figure 10:
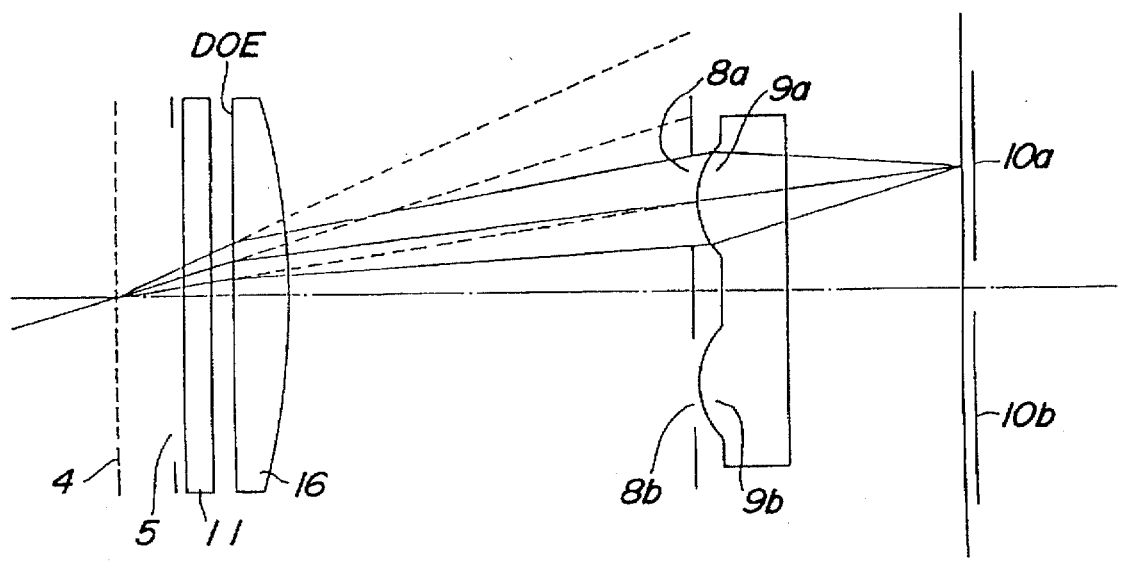
FIG. 10 is a schematic view illustrating a modification of the first embodiment.

Now the present invention will be explained in detail with reference to preferable embodiments, in which the phase difference method using two images is used, but the present invention is not limited to such a method but may be applied to various methods. For instance, a pupil image may be divided into more than two images and a focus condition may be detected in accordance with information obtained by more than two images.

First Embodiment

FIG. 7 is a schematic cross sectional view showing a single lens reflex camera having a first embodiment of the focus detecting optical system according to the invention installed at a bottom of a camera body, and FIG. 8 is a schematic cross sectional view of the focus detecting optical system. In the present embodiment, the focus detecting optical system comprises sub-mirror 3 which is secured to a rear surface of a quick return mirror 2 made of semi-transparent material and arranged within a mirror box provided between an image pick-up lens 1 and an image pick-up plane, e.g. a film plane. A predetermined focal plane 4 of the image pick-up lens 1 is formed between the sub-mirror 3 and a bottom of the mirror box. The focus detecting optical system further includes field stopper 5 arranged in a vicinity of the mirror box, infrared cut filter 11 and condenser lens 16 arranged near the field stop 5, but out of the mirror box, reflecting member 7 arranged behind the condenser lens 16 (reflecting member serves to bend a light path at right angles, but in FIG. 8, a light path is not bent, so that the reflecting member is not shown in FIG. 8), aperture stop arranged behind the reflecting member 7 and having two apertures 8a and 8b arranged side by side in a direction perpendicular to a plane of the drawing of FIG. 7, image reforming lenses 9a and 9b each corresponding to respective apertures 8a and 8b, and light receiving element arrays 10a and 10b each arranged near focal positions of respective image reforming lenses 9a and 9b.

A surface of the condenser lens 16 opposing to the mirror box is formed by a diffraction optical element DOE. DOE is advantageously formed by a kinoform, but may be formed by a binary optical element. The light receiving element arrays 10a and 10b are aligned in the direction perpendicular to the plane of the drawing of FIG. 7. A light flux emanating from an object to be picked-up is transmitted through the image pick-up lens 1 and quick return mirror 2, reflected by the sub-mirror 3 and is focused on the predetermined focal plane 4. When the image pick-up lens 1 is at an in-focused position with respect to the object, an image of the object is formed on the predetermined focal plane 4. A light flux transmitted through the predetermined focal plane 4 is passed through the field stop 5 arranged at the bottom of the mirror box and is made incident upon the focus detecting optical system. Entrance pupils of the focus detecting optical system are relayed by the condenser lens 16 and are reflected by the reflecting member 7 and are made incident upon the apertures 8a and 8b. It should be noted that the entrance pupils of the focus detecting optical system determined by the condenser lens 16 and apertures 8a and 8b are arranged side by side with a distance therebetween which can realize a desired precision of the focus detection.

Light fluxes transmitted through the apertures 8a and 8b are made incident upon the image reforming lenses 9a and 9b, respectively, and are then made incident upon the light receiving element arrays 10a and 10b, respectively which are aligned rectilinearly. Numerical values of various optical elements of the present embodiment are described in the following table 1. r1 to r9 denote radii of curvature of surfaces of the optical elements and d1 to d8 represent thicknesses or air distances.

Table 1 r1=∞ (predetermined focal plane)
d1=4.18
r2=∞
d2=0.5, n=1.518 v=64.15 (infrared cut filter 11)
r3=0.2
d3=0.2
r4=∞ (DOE)
d4=3.1, n=1.527 v=56.25 (condenser lens 16)
r5=9.75
d5=14.43
r6=∞ (aperture stop)
d6=0.1
r7=3.12
d7=2.0 n=1.527 v=56.25 (image reforming lenses 9a, 9b)
r8=∞
d8=6.5
r9=∞ (surfaces of light receiving element arrays 10a, 10b)

In this example, a focal length of the condenser lens 16 is set to 14.84.

In the present embodiment, DOE is designed by an ultra high index method. That is, the values shown in the above table 1 have been designed by the ultra high index method by using a spherical surface. According to the invention, it is also possible to design DOE by using an spherical surface.

Figure 11:
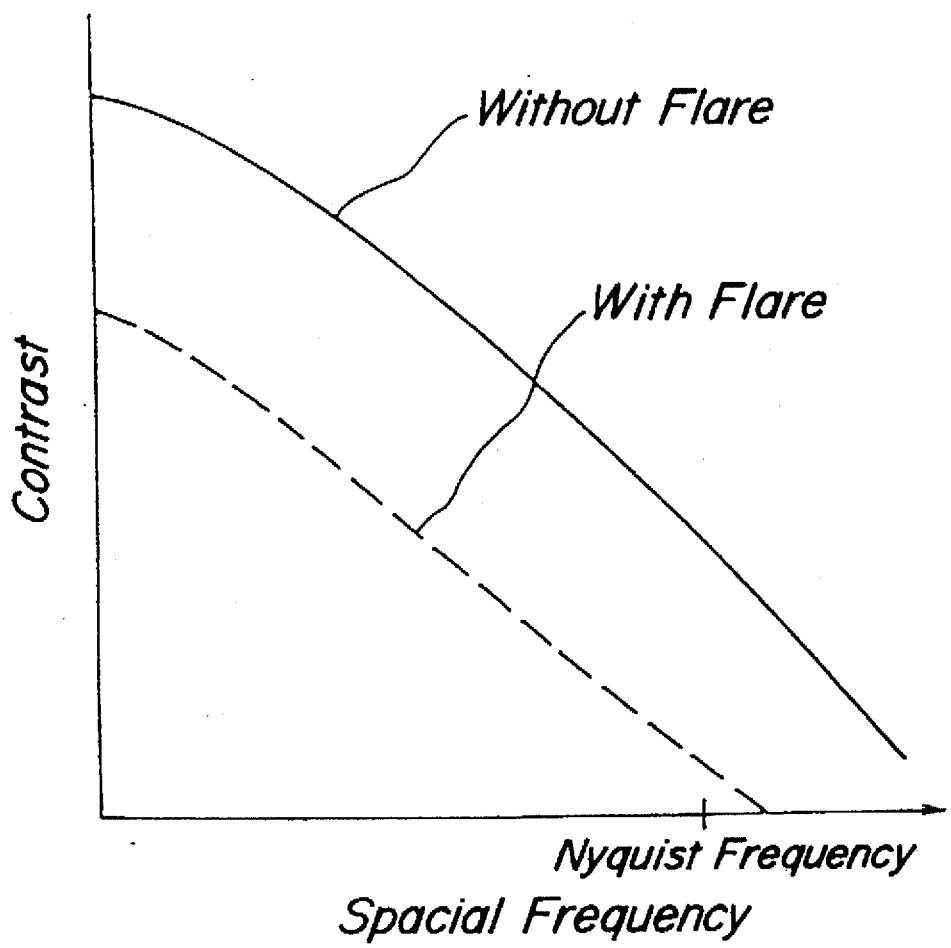
FIG. 11 is a graph representing a relationship between a spatial frequency and contrast with a parameter of flare.
Figure 12:
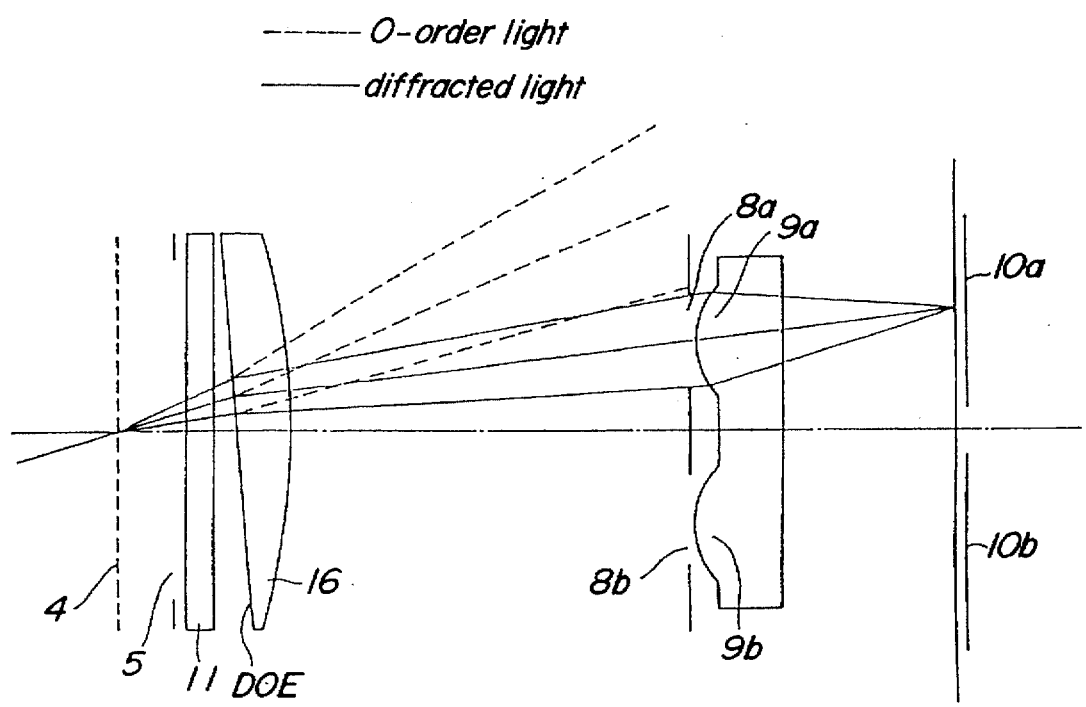
FIG. 12 is a schematic view showing another modification of the first embodiment.
Figure 13:
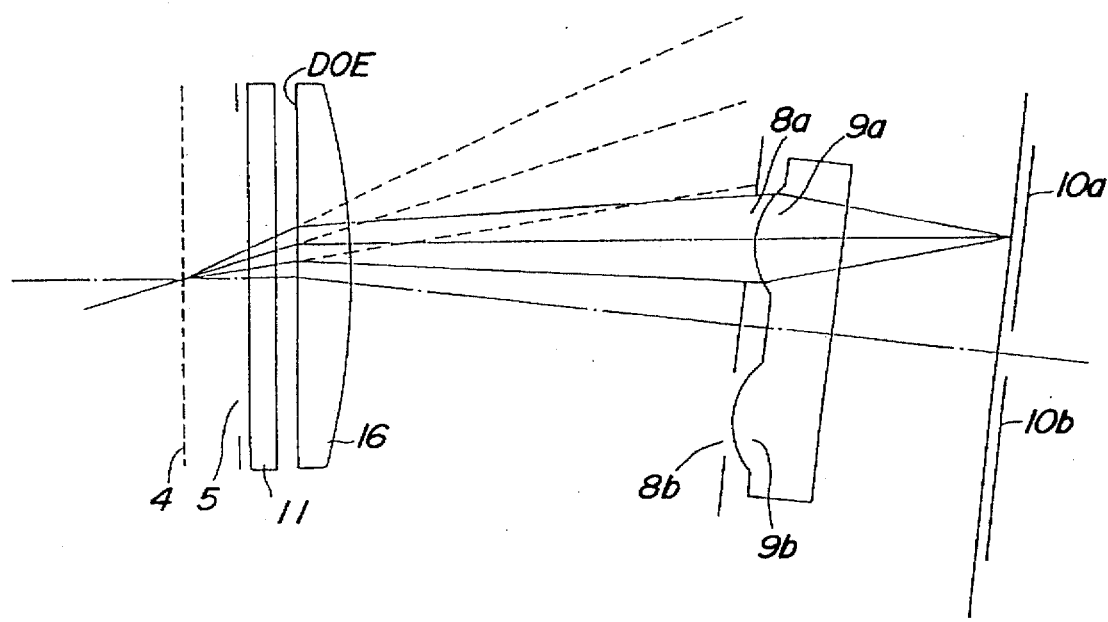
FIG. 13 is a schematic view depicting still another modification of the first embodiment.

Moreover, a surface of the condenser lens 16 opposing to the light receiving element arrays may be formed by a spherical surface. FIG. 9 is a schematic cross sectional view showing a known focus detecting optical system which has substantially same specifications as those of the above explained example, but is designed by using only refractive optical elements. As can be seen from FIG. 9, the transmission of the pupil is not performed at an area remote from a center of a field of view. According to the invention, the focus detecting optical system having a wide and continuous field of view can be realized by using DOE. It should be noted that 0-order beam which is not diffracted by DOE may be treated as flare light as shown in FIG. 10. In this case, a contrast of a high frequency component may be decreased by using the flare light as illustrated in FIG. 11, so that aliasing (moire) is prevented. It should be noted that contrast of a low frequency component used for the focus detection is higher than contrast of high frequency component, and therefore although the flare light is superimposed, there is remained a sufficient high contrast. Furthermore, as depicted in FIG. 12, a substrate for DOE may be inclined with respect to an optical axis, or the optical axis may be bent by DOE as illustrated in FIG. 13. Alternatively the above mentioned two measures may be combined such that the 0-order light and the light diffracted by DOE are separated from each other and the 0-order light is not made incident upon the light receiving elements. Furthermore, the condenser lens 16 may have a refractive surface on a side opposing to the mirror box and DOE may be provided on a surface opposing to the light receiving element arrays. Moreover, both surfaces of the condenser lens 16 may be formed by DOE. It should be further noted that the construction of the condenser lens of the present embodiment may be equally applied to a focus detecting optical system of the contrast method.

Second Embodiment

Figure 14:
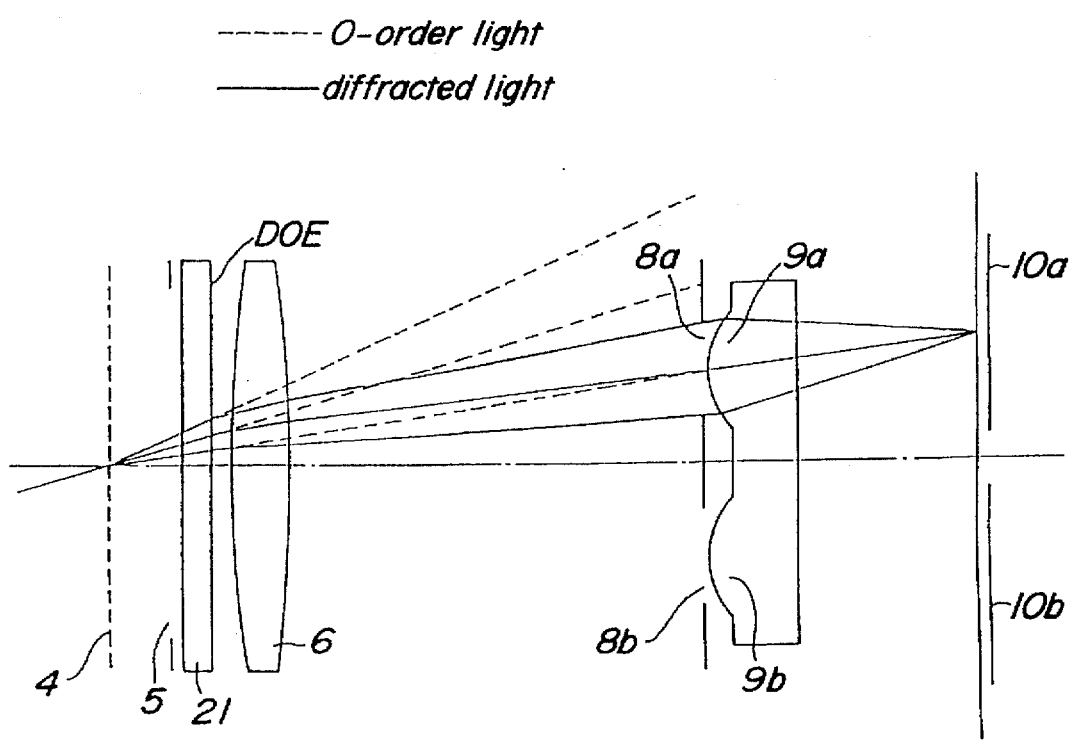
FIG. 14 is a schematic view illustrating a basic construction of a second embodiment of the focus detecting optical system according to the invention.
Figure 19:
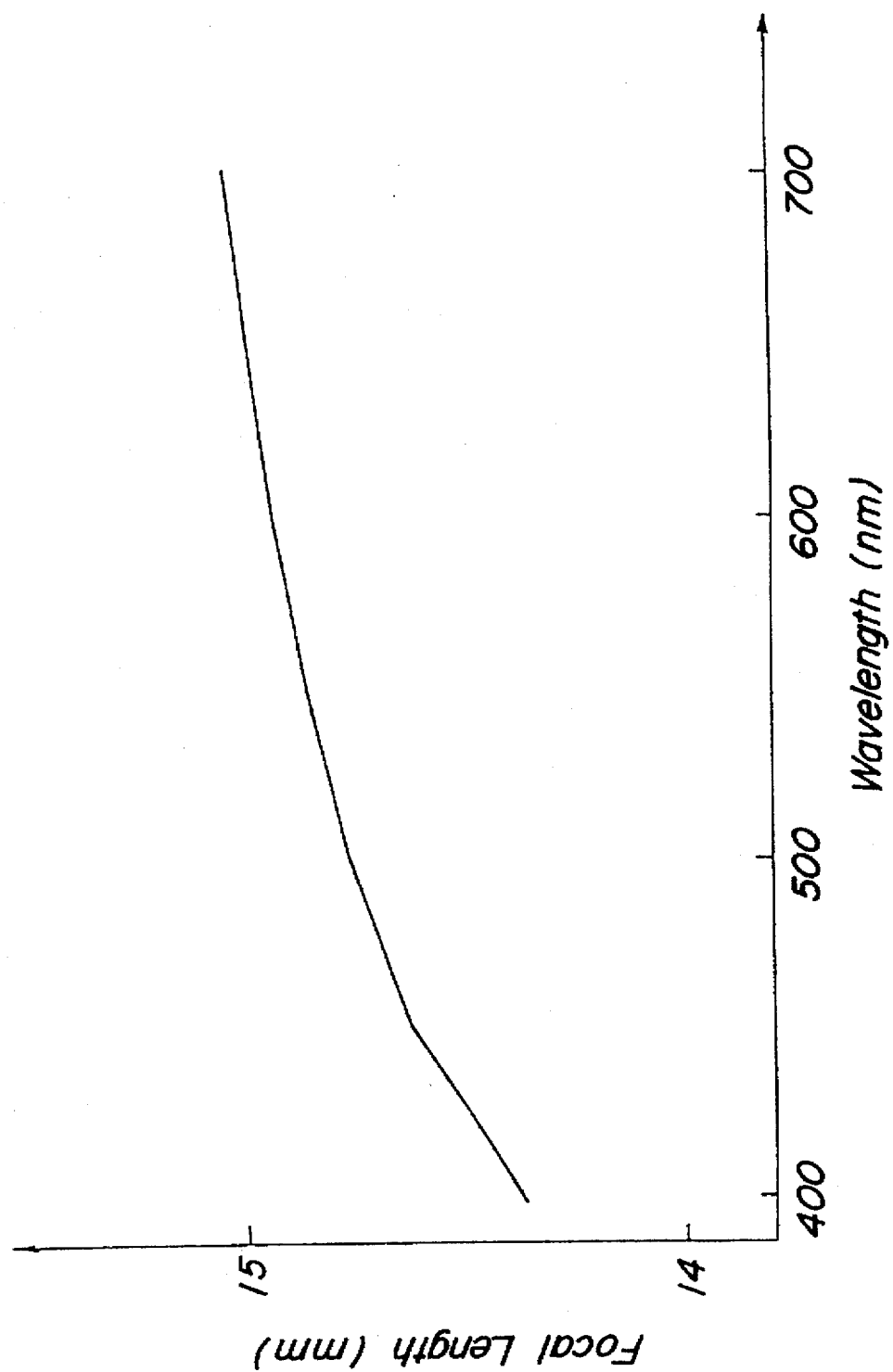
FIG. 19 is a graph showing a relationship between a wavelength and a focal length of a condenser lens.

FIG. 14 is a schematic cross sectional view showing a second embodiment of the focus detecting optical system according to the invention applied to an image pick-up device used in a visible light region. A whole construction of the focus detecting optical system is substantially identical with that of the first embodiment. In the first embodiment, the surface of the condenser lens 6 opposing to the mirror box is formed by DOE, but in the present embodiment, an optical member 21 having a infrared cutting function is arranged near the condenser lens 6 on a side of the condenser lens opposing to the mirror box and DOE is provided on a surface of the optical member 21 opposing to the condenser lens 6. This optical member 21 may be considered as a plane parallel plate. In the present embodiment, DOE has a lens function. A peak wavelength of a spectral diffraction efficiency of DOE is set to a value within a range from 400 nm to 600 nm. FIG. 15 is a graph representing the spectral diffraction efficiency of DOE. Such DOE is preferably formed by a kinoform, but may be formed by a binary optical element.

A light flux emanating from an object to be picked-up is transmitted through the image pick-up lens 1 and quick return mirror 2, reflected by the sub-mirror 3 and is focused on the predetermined focal plane 4. When the image pick-up lens 1 is at an in-focused position with respect to the object, an image of the object is formed on the predetermined focal plane 4. A light flux transmitted through the predetermined focal plane 4 is passed through the field stop 5 arranged at the bottom of the mirror box and is made incident upon the focus detecting optical system. Infrared light in the light flux is decayed by the optical member 21 having the infrared cutting function and is converted into flare light by DOE formed in the optical member 21. Entrance pupils are relayed by the condenser lens 6 and are reflected by the reflecting member 7 (the reflecting member is not shown in FIG. 14) and are made incident upon the apertures 8a and 8b. Also in the present embodiment, the entrance pupils of the focus detecting optical system determined by the condenser lens 6 and apertures 8a and 8b are arranged side by side with a distance therebetween which can realize a desired precision of the focus detection.

Light fluxes transmitted through the apertures 8a and 8b are made incident upon the image reforming lenses 9a and 9b, respectively, and are then made incident upon the light receiving element arrays 10a and 10b, respectively which are aligned rectilinearly. If DOE is not formed in the optical member 21, the filter characteristic of the optical member has to be such that it can decay infrared largely. However, in the present embodiment, due to the spectral diffraction efficiency of DOE, the infrared cutting function of the optical member 21 can be mitigated and thus the construction of deposited films is simple. Moreover, the optical member 21 consisting essentially of the infrared cut filter has the lens function, it contributes to the transmission of the pupils. That is, the converging function of the condenser lens 6 is mitigated. The flare may be treated in the same manner as that of the first embodiment. As illustrated in FIG. 16, a second DOE may be formed in a surface of a condenser lens 26 opposing to the mirror box such that light fluxes diffracted by the first and second DOEs are bent in opposite directions so that asymmetrical aberrations produced by these DOEs can be canceled out. It should be noted that a plane of the drawing of FIG. 16 is rotated by 90 degrees with respect to the plane of the drawing of FIG. 14.

In a modification shown in FIG. 16, one or both of the first DOE formed in the optical member 21 and second DOE formed in the condenser lens 26 may not have the converging or diverging function. Then, the manufacture and estimation of DOE can be simple. Further, since the first and second DOEs have the infrared cut property, the infrared can be suppressed to a larger extent. FIG. 17 is a graph showing an overall diffraction efficiency of the first and second DOEs arranged one behind the other, said DOEs having a peak wavelength of 500 nm. The spectral diffraction efficiency of the diffracted light can be closer to a spectral luminous efficiency or relative luminosity. It should be noted that a peak wavelength of the spectral diffraction efficiency of DOEs may be shifted in accordance with a wavelength of light used in an image pick-up such as infrared image pick-up device and ultraviolet image pick-up device. The present embodiment may be applied to the construction of infrared cut filter and condenser lens of the focus detecting optical system of the contrast method.

Third Embodiment

FIG. 18A is a schematic cross sectional view showing a third embodiment of the focus detecting optical system according to the invention. An overall construction of the present embodiment is substantially identical with that of the first and second embodiments. In the present embodiment, an optical member 31 having a infrared cut function is arranged near the condenser lens 6 on a side of the condenser lens opposing to the mirror box and DOE is provided on a surface of the optical member 31 opposing to the condenser lens 6. Also in the present embodiment, the optical member 31 may be basically formed by a plane parallel plate. In the present embodiment, DOE has a lens function. A peak wavelength of a spectral diffraction efficiency of DOE is set to a value more than 600 nm. For instance, DOE may be constructed to have a peak wavelength of the spectral diffraction efficiency of 700 nm. The DOE is preferably formed by a kinoform, but may be formed by a binary optical element. In FIG. 18A, a distance between DOE and the condenser lens 6 is exaggerated in order to show optical paths of longer wavelength light and shorter wavelength light.

A light flux emanating from an object to be picked-up is transmitted through the image pick-up lens 1 and quick return mirror 2, reflected by the sub-mirror 3 and is focused on the predetermined focal plane 4. When the image pick-up lens 1 is at an in-focused position with respect to the object, an image of the object is formed on the predetermined focal plane 4. A light flux transmitted through the predetermined focal plane 4 is passed through the field stop 5 arranged at the bottom of the mirror box and is made incident upon the focus detecting optical system. Infrared light in the light flux is decayed by the optical member 31 having the infrared cutting function. A light flux which is not diffracted by DOE is not subjected to the lens function and is made incident upon the condenser lens 6. A longer wavelength light flux diffracted by DOE is subjected to the lens function of DOE and is made incident upon the condenser lens 6. If the focus detecting optical system is composed of refractive optical elements without using DOE as illustrated in FIG. 18B, a focal length of the condenser lens 6 is longer for a longer wavelength. A shorter wavelength light flux is not influenced by DOE, but is subjected to the converging function merely by the condenser lens 6. A longer wavelength light flux is subjected to the lens function of DOE and is further subjected to the converging function by both the DOE and condenser lens 6.

Now the above mentioned advantageous effect of the present embodiment will be explained with reference to FIGS. 18A and 18B.

FIG. 18A shows the embodiment of the present invention and FIG. 18B illustrates a known focus detecting optical system. As compared with the prior art, according to the invention, the longer wavelength light and shorter wavelength light are highly coincided with each other on the light receiving element arrays 10a and 10b. This improves the faculty of the focus detection. This is advantageous for a usual image pick-up using visible light, and is particularly effective for an image pick-up using auxiliary light such as longer wavelength visible light and infrared light. A peak wavelength and power of DOE may be determined by considering only the focus detecting optical system or by taking into account of aberrations of the image pick-up lens system. Both of light flux diffracted by DOE and light flux not diffracted by DOE are useful for the focus detection, so that both of them are made incident upon the light receiving element array, while considering a balance over an entire wavelength. That is, on the light receiving element array, the estimation is performed by considering center points of the diffracted light flux and non-diffracted light flux. A similar effect may be attained by setting a peak wavelength on a shorter wavelength range. DOE may be provided on the condenser lens. When DOE is formed on the condenser lens, a surface which is formed as DOE may be curved, so that the lens function is given for the non-diffracted light flux. The construction of the infrared cut filter and condenser lens may be equally applied to the construction of the infrared cut filter and condenser lens of the focus detecting optical system of the contrast method.

Fourth Embodiment

FIG. 20 is a schematic cross sectional view depicting a fourth embodiment of the focus detecting optical system according to the invention. The present embodiment is particularly suitable for an image pick-up apparatus of such a type that an image is pick-up by using visible light, while visible light of a longer wavelength or infrared light is used as auxiliary light. A whole construction of the present embodiment is similar to that of the first embodiment illustrated in FIG. 7. In the present embodiment, an optical member 41 having a infrared cut function is arranged near a condenser lens 46 on a side of the condenser lens opposing to the mirror box and DOE is provided on a surface of the optical member 41 opposing to the condenser lens 46. Also in the present embodiment, the optical member 41 is constructed in the form of a plane parallel plate. In the present embodiment, DOE has a lens function. A peak wavelength of a spectral diffraction efficiency of DOE is set to a value within a range from 700 nm to 1300 nm. In order to separate the auxiliary light from the visible light much more effectively, it is preferable to set the peak wavelength of DOE to a value within a range from 900 nm to 1300 nm. Then, an influence of DOE upon the visible light can be mitigated. FIG. 21 is a graph showing the spectral diffraction efficiency of DOE having the peak wavelength of 1100 nm.

In the present embodiment, a second DOE is formed in a surface of the condenser lens 46, said second DOE having a peak wavelength of a value within a range from 400 nm to 600 nm. For instance, a peak wavelength of the second DOE may be set to 500 nm. The first and second DOEs may be advantageously formed by a kinoform, but may be formed by a binary optical element.

A light flux emanating from an object to be picked-up is transmitted through the image pick-up lens 1 and quick return mirror 2, reflected by the sub-mirror 3 and is focused on the predetermined focal plane 4. When the image pick-up lens 1 is at an in-focused position with respect to the object, an image of the object is formed on the predetermined focal plane 4. A light flux transmitted through the predetermined focal plane 4 is passed through the field stop 5 arranged at the bottom of the mirror box and is made incident upon the focus detecting optical system. Infrared light in the light flux is decayed by the optical member 41 having the infrared cut function. The auxiliary light flux is subjected to the lens function by the first DOE having the peak wavelength from 700 nm to 900 nm and then is made incident upon the condenser lens 46. The visible light flux for use in the image pick-up is subjected to the lens function by the second DOE having the peak wavelength from 400 nm to 600 nm. The auxiliary light flux is made incident upon the condenser lens 46 without being diffracted by the first DOE. That is to say, the auxiliary light flux is transmitted through the first DOE as 0-order light. After emanating from the condenser lens 46, the light flux is treated in the same manner as that of the first embodiment. In the present embodiment, the visible light flux and auxiliary light flux are subjected to the lens function independently from each other, and therefore a possible decrease in a precision of the focus detection due to chromatic aberrations of the image forming lens and focus detecting optical system can be removed. The first and second DOEs having different peak wavelengths may be formed in surfaces of either one of the infrared cut filter 41 and condenser lens 46. Further the present embodiment may be equally applied to the construction of the infrared cut filter and condenser lens of the focus detecting optical system of the contrast method.

In the present embodiment, it is preferable to satisfy the following condition.

$$200 \text{ nm} < \lambda R - \lambda G < 800 \text{ nm} \tag{10}$$

wherein λR is a peak wavelength of the spectral diffraction efficiency of the first DOE for the longer wavelength light and λG is a peak value of the spectral diffraction efficiency of the second DOE for the visible light. When a difference between the peak wavelengths λR−λG becomes smaller than the lower limit of 200 nm, a larger amount of light flux is subjected to the diffracting function of DOE and when said difference exceeds the upper limit of 800 nm, a larger amount of light having wavelength from 200 nm to 800 nm is not subjected to the diffraction. It is particularly preferable to set the upper limit to 400 nm. In this case, almost all light is subjected to the diffraction either by the first and second DOEs. However, when the optical system is designed by considering light which is not subjected to the diffraction by either DOEs, the upper limit may be extended up to 800 nm. Light having a middle wavelength is refracted only by the lens function, light having a shorter wavelength is corrected by one of the two DOEs and light having a longer wavelength is corrected by the other DOE. In this case, the lower limit may be set to 400 nm, and then a wavelength range of light which is not diffracted by any of the two DOEs can be expanded.

In the present embodiment, it is further preferable to satisfy the following condition:

$$-200 \text{ nm} < \lambda R - \lambda S < 500 \text{ nm} \tag{11}$$

wherein λS is a peak wavelength of the spectral diffraction efficiency for the auxiliary light or light having an average wavelength. If the above condition is not satisfied, DOE for the longer wavelength could not give sufficient lens function for the auxiliary light.

Fifth Embodiment

FIG. 22 is a schematic cross sectional view showing a fifth embodiment of the focus detecting optical system according to the invention. A whole construction of the present embodiment is similar to that of the first embodiment illustrated in FIG. 7. In the present embodiment, surfaces of image reforming lenses 59a and 59b opposing to the mirror box are formed as DOEs. DOE is preferably formed by a kinoform, but may be formed by a binary optical element. A light flux emanating from an object to be picked-up is transmitted through the image pick-up lens 1 and quick return mirror 2, reflected by the sub-mirror 3 and is focused on the predetermined focal plane 4. When the image pick-up lens 1 is at an in-focused position with respect to the object, an image of the object is formed on the predetermined focal plane 4. A light flux transmitted through the predetermined focal plane 4 is passed through the field stop 5 arranged at the bottom of the mirror box and is made incident upon the focus detecting optical system. Light fluxes transmitted through pupil are relayed by the condenser lens 6, are reflected by the reflecting member, and are made incident upon apertures 8a and 8b. Entrance pupils determined by the condenser lens 6 and apertures 8a and 8b are arranged side by side with a distance which can guarantee a desired precision of focus detection.

Figure 24:
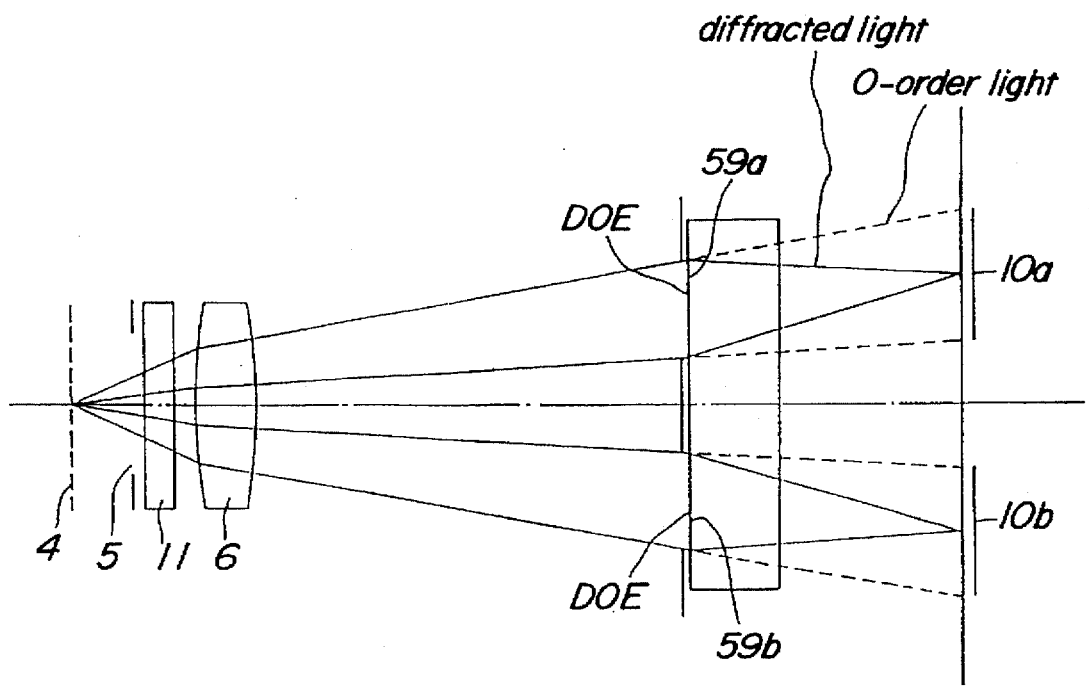
FIG. 24 is a schematic view depicting a modification of the fifth embodiment.

Light fluxes passing through the apertures 8a and 8b are made incident upon the image reforming lenses 59a and 59b, respectively. FIG. 23 is a plan view showing the front surface of the image reforming lenses 59a and 59b. As can be seen from FIG. 22, the image reforming lenses 59a and 59b are constructed by a plane parallel plate. As illustrated in FIG. 23, each of the image reforming lenses 59a and 59b is formed by concentric circular diffractive gratings. Error in a distance between the two image reforming lenses 59a and 59b, error in power (error measured by a Newton rings in a refractive lens system) and error in asymmetry due to manufacturing can be measured by enlarging the diffractive gratings and inspecting in a two-dimensional manner. This measuring method can give much simpler and accurate quality control as compared with the known three-dimensional measuring method. The diffractive gratings can be formed to have any desired shape by utilizing the lithography. In the present embodiment, since effective areas of the two image reforming lenses are closer to each other, it is possible to provide wider effective areas. It should be noted that a 0-order light not diffracted by the DOE may be treated as flare light as depicted in FIG. 24. Furthermore, as illustrated in FIG. 11, contrast of higher frequency component may be decreased by using the flare light so as to prevent the arising. The focus detection is performed by lower frequency component having a higher contrast than that of the higher frequency contrast, and thus the focus detection can be carried out effectively.

Sixth Embodiment

FIG. 25 is a schematic cross sectional view showing a sixth embodiment of the focus detecting optical system according to the invention. A whole construction of the present embodiment is similar to that of the first embodiment illustrated in FIG. 7. In the present embodiment, surfaces of image reforming lenses 69a and 69b opposing to the mirror box are formed as DOEs having the aperture stop function. DOE is preferably formed by a kinoform, but may be formed by a binary optical element.

A light flux emanating from an object to be picked-up is transmitted through the image pick-up lens 1 and quick return mirror 2, reflected by the sub-mirror 3 and is focused on the predetermined focal plane 4. When the image pick-up lens 1 is at an in-focused position with respect to the object, an image of the object is formed on the predetermined focal plane 4. A light flux transmitted through the predetermined focal plane 4 is passed through the field stop 5 arranged at the bottom of the mirror box and is made incident upon the focus detecting optical system. Light fluxes transmitted through pupils are relayed by the condenser lens 6, are reflected by the reflecting member, and are made incident upon the image reforming lenses 69a and 69b. Entrance pupils determined by the condenser lens 6 and image reforming lenses 69a and 69b are arranged side by side with a distance which can guarantee a desired precision of focus detection.

FIG. 26 is a plan view showing the front surface of the image reforming lenses 69a and 69b. Diffractive gratings constituting the image reforming lenses 69a and 69b are circular and are formed only in effective areas of lenses, so that DOEs can have the aperture stop function. That is to say, the light flux emanating from the condenser lens 6 impinges upon the image reforming lenses 69a and 69b, and a portion of the light flux impinging upon a non-effective portion 69c is not subjected to the lens function, so that light emanating from the image reforming lenses 69a and 69b and impinging upon the light receiving element arrays is weak and is treated as the flare. The light flux impinging upon the effective area of the image reforming lenses 69a and 69b is subjected to the lens function, and thus light impinging upon the light receiving element arrays has a high contrast. In this manner, the focus condition can be detected effectively. In the present embodiment, it is not necessary to provide the independent aperture stops, and thus cost of parts and assembling can be reduced and a decrease in the focus detection due to error of the independent aperture stops can be avoided. A light shielding film or paint may be applied on the non-effective area 69c. An image reforming lens of refraction type used in the known focus detecting optical system has a curved surface in the non-effective region, but in the present embodiment, the non-effective region of the image reforming lens is flat, so that the light shielding treatment can be easily effected.

Seventh Embodiment

Figure 27A:
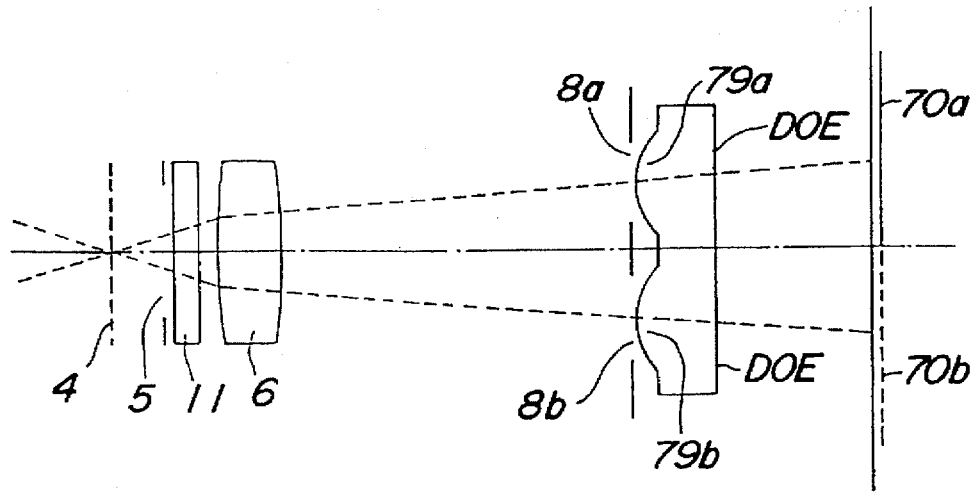
FIGS. 27A and 27B are schematic views illustrating a seventh embodiment of the focus detecting optical system according to the invention.
Figure 27B:
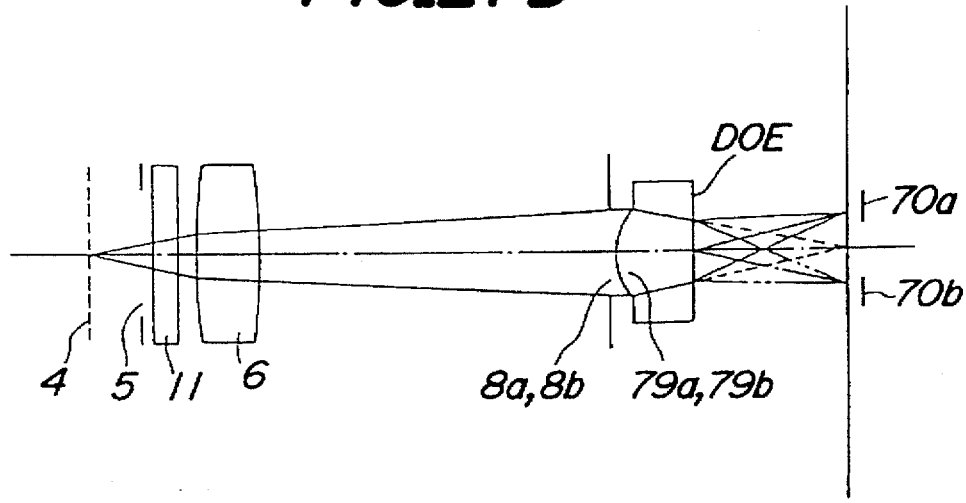

FIG. 27A is a schematic cross sectional view illustrating a seventh embodiment of the focus detecting optical system according to the invention, and FIG. 27B is a view shown from a direction perpendicular to a plane of the drawing of FIG. 27A. A whole construction is similar to that of the first embodiment shown in FIG. 7. In the present embodiment, surfaces of image reforming lenses 79a and 79b opposing to light receiving element arrays 70a and 70b are formed by DOEs. DOE is preferably formed by a kinoform, but may be formed by a binary optical element.

A light flux emanating from an object to be picked-up is transmitted through the image pick-up lens 1 and quick return mirror 2, reflected by the sub-mirror 3 and is focused on the predetermined focal plane 4. When the image pick-up lens 1 is at an in-focused position with respect to the object, an image of the object is formed on the predetermined focal plane 4. A light flux transmitted through the predetermined focal plane 4 is passed through the field stop 5 arranged at the bottom of the mirror box and is made incident upon the focus detecting optical system. Light fluxes transmitted through pupils are relayed by the condenser lens 6, are reflected by the reflecting member, and are made incident upon the apertures 8a and 8b. Entrance pupils determined by the condenser lens 6 and apertures 8a and 8b are arranged side by side with a distance which can guarantee a desired precision of focus detection.

Figure 28A:
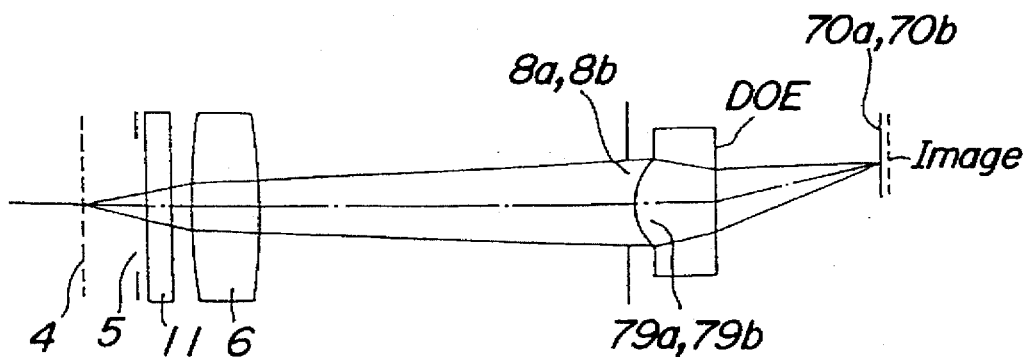
FIG. 28A is a schematic view showing the seventh embodiment in which DOE is formed in an exit surface of an image reforming lens.
Figure 28B:
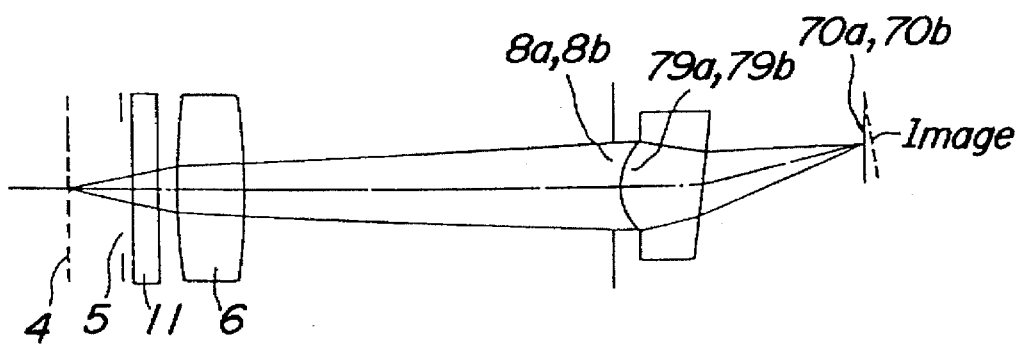
FIG. 28B is a schematic view illustrating a known focus detecting optical system using only refractive elements.

Light fluxes transmitted through the apertures 8a and 8b are made incident upon the image reforming lenses 79a and 79b, respectively. The light fluxes emanating from the image reforming lenses 79a and 79b are refracted by DOEs in opposite directions which are perpendicular to a direction in which the apertures 8a and 8b are aligned. FIG. 28A illustrates a case in which DOE is formed on the exit surface of the image reforming lens and FIG. 28B shows a case in which the refractive function of the image reforming lens is utilized as in the known focus detecting optical system. When the light flux is bent by utilizing the refractive function as shown in FIG. 28B, a focused image is inclined with respect to the light receiving element array. A direction of this inclination is opposite for the two light fluxes emanating from the image reforming lenses 79a and 79b, and therefore the light receiving element arrays 70a and 70b have to be inclined in opposite directions. This results in that the two light receiving element arrays 70a and 70b could not be formed on the same plane. In this manner, when the incident surfaces of the light receiving element arrays have to be made in parallel with the images, the light receiving element arrays could not be formed on the same plane so that they could not be simply manufactured. If the two light receiving element arrays are formed on the same plane, magnifications of the image at opposite ends differ from each other. This contradicts the principle of the focus detection that the two identical images are compared with each other and a precision of the focus detection would be decreased. By utilizing DOE, such a drawback can be avoided. 0-order light which is transmitted through DOE without being diffracted is converged in a region between the light receiving element arrays 70a and 70b as depicted in FIG. 29.

Eighth Embodiment

FIG. 30 is a schematic view showing a single lens reflex camera having an eighth embodiment of the focus detecting optical system according to the invention installed therein. FIG. 31A is a schematic view illustrating the focus detecting optical system of the present embodiment and FIG. 31B is a schematic view seen from a direction perpendicular to a plane of the drawing of FIG. 31A. In the embodiments so far explained, there is provided at least one DOE, but in the present embodiment, no DOE is used. There are arranged an image pick-up lens 1, a quick return mirror 2 made of semitransparent material and arranged in a mirror box provided between the image pick-up lens 1 and a film, a sub-mirror secured to a rear surface of the quick return mirror 2, a field stop 5 arranged at a bottom of the mirror box, a condenser lens 6 arranged near the field stop 5, but out of the mirror box, a reflecting member 7 (see FIG. 30) arranged behind the condenser lens 6, an aperture stop having two apertures 8a and 8b which are arranged side by side in a direction perpendicular to a plane of the drawing of FIG. 30, image reforming lenses 89a and 89b each corresponding to respective apertures 8a and 8b, and light receiving element arrays 70a and 70b arranged on optical paths of light fluxes emanating from the image reforming lenses 89a and 89b near focal points. The image reforming lenses 89a and 89b have different powers in a first direction in which the two image reforming lenses are aligned and in a second direction which is perpendicular to said first direction. Now it is assumed that the power in the first direction is denoted as φh and that in the second direction is represented by φv. Then it is preferable to satisfy the following condition:

$$\phi h < \phi v \tag{12}$$

Now a method of determining the powers φh and φv of the image reforming lenses will be explained. φh and φv are determined such that a conjugate plane RIh with respect to the predetermined focal plane 4 formed by the condenser lens 6 and one of the image reforming lenses 89a and 89b having the power of φh becomes substantially identical with a conjugate plane RIv with respect to the field stop frame 5 formed by the condenser lens 6 and the other of the image forming lenses. The light receiving element arrays 70a and 70b are arranged substantially on the conjugate plane RIv. It is possible to give a difference between φh and φv by forming the exit surfaces of the image reforming lenses 89a and 89b.

A light flux emanating from an object to be picked-up is transmitted through the image pick-up lens 1 and quick return mirror 2, reflected by the sub-mirror 3 and is focused on the predetermined focal plane 4. When the image pick-up lens 1 is at an in-focused position with respect to the object, an image of the object is formed on the predetermined focal plane 4. A light flux transmitted through the predetermined focal plane 4 is passed through the field stop 5 arranged at the bottom of the mirror box and is made incident upon the focus detecting optical system. Light fluxes transmitted through pupils are relayed by the condenser lens 6, are reflected by the reflecting member, and are made incident upon the apertures 8a and 8b. Entrance pupils of the focus detecting optical system determined by the condenser lens 6 and apertures 8a and 8b are arranged side by side with a distance which can guarantee a desired precision of focus detection.

Figure 32A:
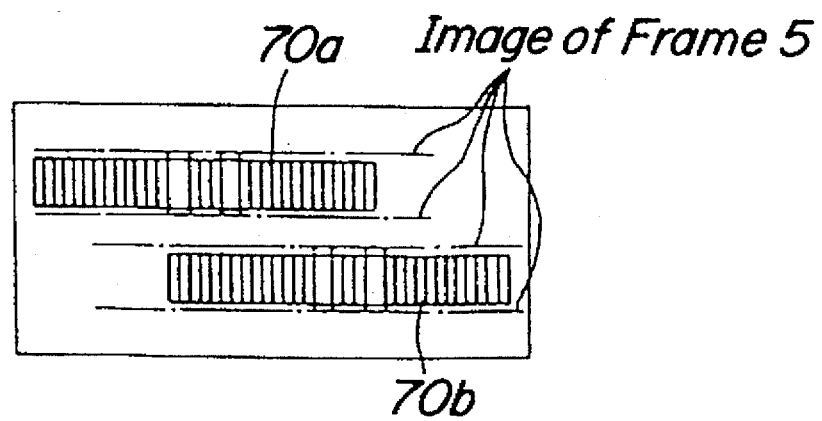
FIG. 32A is a schematic view showing a condition of light impinging upon light receiving element arrays in a ninth embodiment.
Figure 32B:
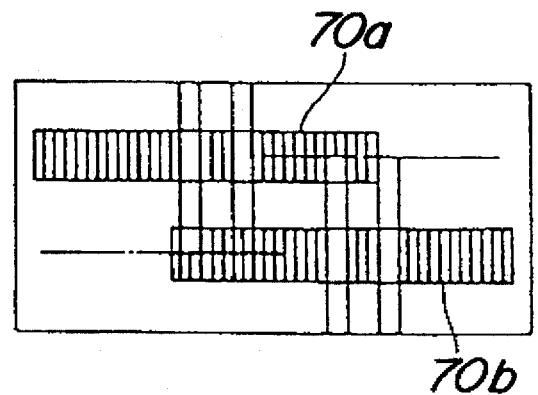
FIG. 32B is a schematic view illustrating a similar condition in a known focus detecting optical system.

Light fluxes transmitted through the apertures 8a and 8b are made incident upon the image reforming lenses 89a and 89b, respectively. Upon emanating from the image reforming lenses 89a and 89b, these light fluxes are refracted thereby in opposite directions which are perpendicular to a direction in which the apertures 8a and 8b are aligned, and then are made incident upon the light receiving element arrays 70a and 70b, respectively. As shown in FIG. 32A, the image on the predetermined focal plane 4, that is the in-focused image of the object are formed in a direction in which the light receiving elements are aligned. At the same time, images of the field stop frame 5 are formed in a direction in which light receiving element arrays are aligned. In the present embodiment, a light flux emanating from the image reforming lens 89a and not impinging upon the light receiving element array 70a is shielded by the field stop frame 5 and is not made incident upon the light receiving element array 70b. Similarly, a light flux emanating from the image reforming lens 89b and not impinging upon the light receiving element array 70b is shielded by the field stop frame 5 and is not made incident upon the light receiving element array 70a. Therefore, a flare is hardly produced, so that the two light receiving element arrays 70a and 70b can be arranged closer to each other. FIG. 32B illustrates images formed on the light receiving element arrays in a known focus detecting optical system in which the predetermined focal plane is in the mirror box. In the present embodiment, the image reforming lenses are constituted by the cylindrical lenses, but according to the invention, they may be formed by anamorphic lenses in which curvatures of entrance surfaces are made different in a direction in which the image reforming lenses are aligned and in a direction perpendicular to the direction in which the image reforming lenses are aligned. In this case, a position at which a power is generated can be set to be remote from the image plane, and thus a difference between $\phi h$ and $\phi v$ can be small and points of power can be reduced. However, the manufacture and estimation of the anamorphic lens are difficult as compared with the usual lens and cylindrical lens. Therefore, it is much more preferable to constitute the optical system by usual lenses and cylindrical lenses. Moreover, according to the present invention, the image reforming lenses may be formed by cylindrical lenses which have power in a direction in which the lenses are aligned. A length of an effective area of the image reforming lenses viewed in the direction in which the lenses are aligned is longer than that in the direction perpendicular to the direction in which the lenses are aligned, and thus it is preferable to constitute the image reforming lenses by the cylindrical lenses having the power in the direction perpendicular to the direction of the alignment of the lenses. Further, a similar function can be attained by constructing the condenser lens by an anamorphic lens, but usually the condenser lens is arranged neat the field stop frame, so that it is necessary to make large the difference in power between the direction in which the lenses are aligned and the direction perpendicular to said direction.

Ninth Embodiment

Figure 33A:
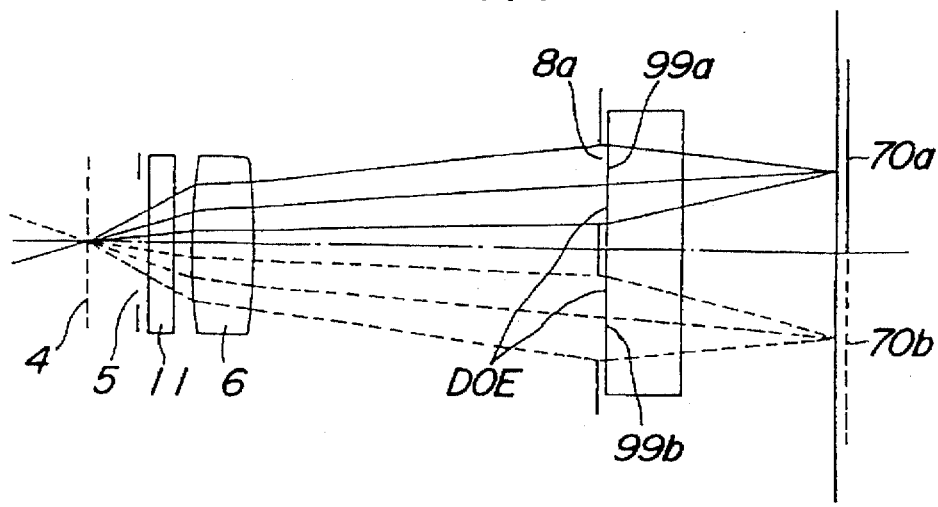
FIGS. 33A and 33B are schematic views illustrating a ninth embodiment of the focus detecting optical system according to the invention.
Figure 33B:
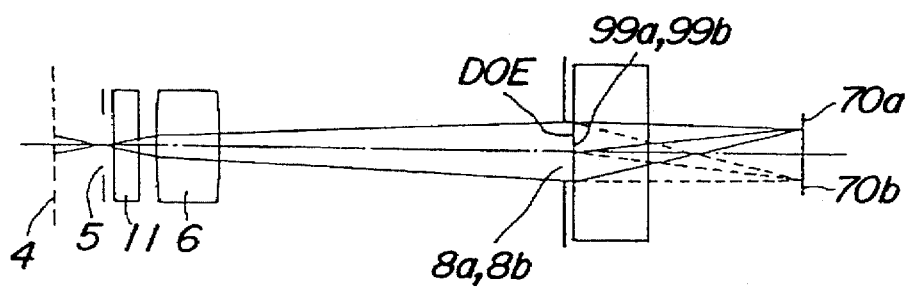
Figure 34:
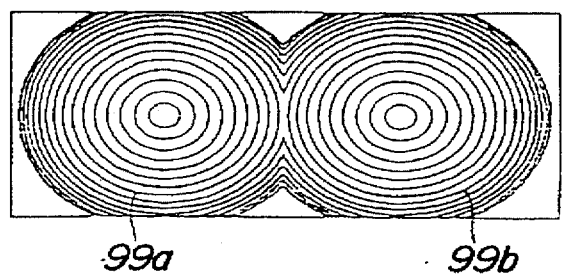
FIG. 34 is a plan view showing image reforming lenses in the ninth embodiment.

FIGS. 33A and 33B illustrate a ninth embodiment of the focus detecting optical system according to the invention. FIG. 33B is a view seen from a direction perpendicular to a plane of the drawing of FIG. 33A. A whole construction including the image pick-up lens is substantially identical with that of the first embodiment shown in FIG. 7. In the present embodiment, there are provided image reforming lenses 99a and 99b each corresponding to respective apertures 8a and 8b of the aperture stop. A pair of light receiving element arrays 70a and 70b are arranged on a plane near a focal plane of light fluxes emanating from the image reforming lenses 99a and 99b. Each of these image reforming lenses 99a and 99b is formed by DOE and has different powers in a direction in which the image reforming lenses are aligned and in a direction perpendicular to said direction. As shown in FIG. 34, image reforming lenses 99a and 99b are formed by elliptical diffraction gratings. Power $\phi h$ of the image reforming lenses 99a and 99b in the direction in which the apertures 8a and 8b are aligned and power $\phi v$ in the direction perpendicular to the direction in which the apertures 8a and 8b are aligned have the following condition:

$$\phi h < \phi v \tag{13}$$

The powers $\phi h$ and $\phi v$ of the image reforming lenses 99a and 99b may be determined by the same method as that of the previous embodiment. That is, $\phi h$ and $\phi v$ are determined such that a conjugate plane RIh with respect to the predetermined focal plane 4 formed by the condenser lens 6 and one of the image reforming lenses 89a and 89b having the power of $\phi h$ becomes substantially identical with a conjugate plane RIv with respect to the field stop frame 5 formed by the condenser lens 6 and the other of the image forming lenses. The light receiving element arrays 70a and 70b are arranged substantially on the conjugate plane RIv. As shown in FIG. 34, each of the image reforming lenses 99a and 99b is formed by diffractive grating whose diameter measured in the direction in which the apertures 8a and 8b are aligned differ from a diameter measured in the direction perpendicular to the aligning direction of the apertures.

A light flux emanating from an object to be picked-up is transmitted through the image pick-up lens 1 and quick return mirror 2, reflected by the sub-mirror 3 and is focused on the predetermined focal plane 4. When the image pick-up lens 1 is at an in-focused position with respect to the object, an image of the object is formed on the predetermined focal plane 4. A light flux transmitted through the predetermined focal plane 4 is passed through the field stop 5 arranged at the bottom of the mirror box and is made incident upon the focus detecting optical system. Light fluxes transmitted through pupils are relayed by the condenser lens 6, are reflected by the reflecting member, and are made incident upon the apertures 8a and 8b. Entrance pupils of the focus detecting optical system determined by the condenser lens 6 and apertures 8a and 8b are arranged side by side with a distance which can guarantee a desired precision of focus detection.

Light fluxes transmitted through the apertures 8a and 8b are made incident upon the image reforming lenses 99a and 99b, respectively. Upon emanating from the image reforming lenses 89a and 89b, these light fluxes are refracted thereby in opposite directions which are perpendicular to a direction in which the apertures 8a and 8b are aligned, and then are made incident upon the light receiving element arrays 70a and 70b, respectively. Images on the predetermined focal plane 4, i.e. the in-focused images of the object are formed in a direction in which the light receiving elements are aligned and images of the field stop frame 5 are formed in a direction in which light receiving element arrays are aligned. In the present embodiment, a light flux emanating from the image reforming lens 99a and not impinging upon the light receiving element array 70a is shielded by the field stop frame 5 and is not made incident upon the light receiving element array 70b. Similarly, a light flux emanating from the image reforming lens 99b and not impinging upon the light receiving element array 70b is shielded by the field stop frame 5 and is not made incident upon the light receiving element array 70a. Therefore, a flare is hardly produced, and the two light receiving element arrays 70a and 70b can be arranged closer to each other. In the present embodiment, each of the image reforming lenses 99a and 99b is constituted by an anamorphic lens formed by DOE, so that the manufacture and estimation of the image reforming lenses 99a and 99b are simpler than the usual refraction type anamorphic lens. DOE can be easily formed by the lithographic method, because DOE can be manufactured easily from two dimensional design information. Further, the manufactured DOE can be simply estimated from two dimensional information obtained by inspecting DOE with a microscope.

Tenth Embodiment

FIGS. 35A and 35B are schematic views showing a tenth embodiment of the focus detecting optical system according to the invention. FIG. 35B is a view seen from a direction perpendicular to a plane of the drawing of FIG. 35A. A whole construction including the image pick-up lens is substantially identical with that of the first embodiment shown in FIG. 7. In the present embodiment, image reforming lenses 109a and 109b each corresponding to respective apertures 8a and 8b of the aperture stop arranged behind the reflecting member 7 are formed to have DOEs on surfaces opposing to the light receiving element arrays 70a and 70b. DOEs are formed to have the refractive function in a direction along which the apertures 8a and 8b are aligned. Each of these DOEs has different powers viewed in the direction in which the apertures 8a and 8b are aligned and in the direction perpendicular to said direction. Power $\phi h$ of the image reforming lenses 99a and 99b in the direction in which the apertures 8a and 8b are aligned and power $\phi v$ in the direction perpendicular to the direction in which the apertures 8a and 8b are aligned have the following condition:

$$\phi h < \phi v \tag{14}$$

The powers $\phi h$ and $\phi v$ of the image reforming lenses 99a and 99b may be determined by the same method as that of the previous embodiment. That is, $\phi h$ and $\phi v$ are determined such that a conjugate plane RIh with respect to the predetermined focal plane 4 formed by the condenser lens 6 and one of the image reforming lenses 89a and 89b having the power of $\phi h$ becomes substantially identical with a conjugate plane RIv with respect to the field stop frame 5 formed by the condenser lens 6 and the other of the image forming lenses. The light receiving element arrays 70a and 70b are arranged substantially on the conjugate plane RIv. DOE is preferably formed by a kinoform, but may be formed by a binary optical element.

A light flux emanating from an object to be picked-up is transmitted through the image pick-up lens 1 and quick return mirror 2, reflected by the sub-mirror 3 and is focused on the predetermined focal plane 4. When the image pick-up lens 1 is at an in-focused position with respect to the object, an image of the object is formed on the predetermined focal plane 4. A light flux transmitted through the predetermined focal plane 4 is passed through the field stop 5 arranged at the bottom of the mirror box and is made incident upon the focus detecting optical system. Entrance pupils of the focus detecting optical system are relayed by the condenser lens 6, are reflected by the reflecting member, and are made incident upon the apertures 8a and 8b. Entrance pupils of the focus detecting optical system determined by the condenser lens 6 and apertures 8a and 8b are arranged side by side with a distance which can guarantee a desired precision of focus detection.

Light fluxes transmitted through the apertures 8a and 8b are made incident upon the image reforming lenses 109a and 109b, respectively. Upon emanating from the image reforming lenses 109a and 109b, these light fluxes are refracted thereby in opposite directions which are perpendicular to a direction in which the apertures 8a and 8b are aligned, and then are made incident upon the light receiving element arrays 70a and 70b, respectively. Images on the predetermined focal plane 4, i.e. the in-focused images of the object are formed in a direction in which the light receiving elements are aligned and images of the field stop frame 5 are formed in a direction in which light receiving element arrays are aligned. FIG. 36 is a schematic plane view showing the diffractive gratings of DOEs formed in the surfaces of the image reforming lenses 109a and 109b opposing to the light receiving element arrays 70a and 70b. As shown in FIG. 36, image reforming lenses 109a and 109b have the following construction. Each has a pitch which is continuously changed in a first direction, and they are arrayed in a second direction which is perpendicular to the first direction. In the present embodiment, a light flux emanating from the image reforming lens 109a and not impinging upon the light receiving element array 70a is shielded by the field stop frame 5 and is not made incident upon the light receiving element array 70b. Similarly, a light flux emanating from the image reforming lens 109b and not impinging upon the light receiving element array 70b is shielded by the field stop frame 5 and is not made incident upon the light receiving element array 70a. Therefore, a flare is hardly produced, and the two light receiving element arrays 109a and 109b can be arranged closer to each other. 0-order light flux not diffracted by DOE serves as the diffracted light flux in the direction in which the light receiving elements are aligned, and thus the formation of the image of the aperture stop frame 5 is not influenced. 0-order light flux not diffracted by DOE serves as the flare in the direction in which the two light receiving element arrays 70a and 70b are aligned, and thus the high frequency component is weakened.

Eleventh Embodiment

FIG. 37 is a schematic view illustrating an eleventh embodiment of the focus detecting optical system according to the invention. A whole construction including the image pick-up lens is substantially identical with that of the first embodiment shown in FIG. 7. In the present embodiment, surfaces of image reforming lenses 119a and 119b opposing to the mirror box are formed by DOEs. DOE is preferably formed by a kinoform, but may be formed by a binary optical element. A light flux emanating from an object to be picked-up is transmitted through the image pick-up lens 1 and quick return mirror 2, reflected by the sub-mirror 3 and is focused on the predetermined focal plane 4. When the image pick-up lens 1 is at an in-focused position, an image of the object is formed on the predetermined focal plane 4. A light flux transmitted through the predetermined focal plane 4 is passed through the field stop 5 arranged at the bottom of the mirror box and is made incident upon the focus detecting optical system. Entrance pupils of the focus detecting optical system are relayed by the condenser lens 6, are reflected by the reflecting member, and are made incident upon the apertures 8a and 8b. Entrance pupils of the focus detecting optical system determined by the condenser lens 6 and apertures 8a and 8b are arranged side by side with a distance which can guarantee a desired precision of focus detection.

Light fluxes transmitted through the apertures 8a and 8b are made incident upon the image reforming lenses 119a and 119b, respectively, and are then made incident upon light receiving element arrays 10a and 10b which are aligned in a single line. Each of the image reforming lenses 119a and 119b is formed to have two focal points. Now it is assumed that in the light receiving element arrays 10a and 10b, light receiving elements are arranged at a pitch P. Light emanating from a point Io on the predetermined focal plane 4 is focused at two points P1 and P2 which are separated by P/2 in the direction in which light receiving elements are aligned.

FIG. 38 is a plan view showing the construction of DOEs constituting the image reforming lenses 119a and 119b. Each of the image reforming lenses 119a and 119b has a region PR1 for converging the light flux emanating from the point Io onto the point P1 and a region PR2 for converging the light flux onto the point P2. These regions PR1 and PR2 are arranged to be symmetrical with respect to a line extending in the direction in which the lenses 119a and 119b are aligned. Each of these regions is formed by diffractive gratings consisting of a part of concentric circles having a same center. Centers of the concentric circles forming the regions PR1 and PR2 are deviated from each other in the direction in which the light receiving element arrays 10a and 10b are aligned. Therefore, conditions of focused images at points P1 and P2 on respective regions are similar to each other. In the present embodiment, a contrast at the Nyquist frequency which might produce moire can be set substantially to zero without decreasing a contrast at a lower frequency which is effective for detecting the focus condition.

In the present embodiment, since the image reforming lenses 119a and 119b are formed by DOEs, there is no step between the regions PR1 and PR2. If a plurality of lens function regions are formed in a usual refractive type lens, there is formed a step between these regions. It is apparent that the step does not have given lens function so that it does not contribute to the focus detection and might become error. Moreover, the manufacture and estimation of the image reforming lenses formed by DOEs are easier than the usual refractive type lenses having a plurality of lens function regions. DOE can be easily formed by the lithographic method, because DOE can be manufactured easily from two-dimensional design information. Further, the manufactured DOE can be simply estimated from two-dimensional information obtained by inspecting DOE with a microscope. It is preferable to form the image reforming lens to have the regions arranged symmetrically with respect to the line extending in the direction in which the lenses are aligned, but according to the invention, the arrangement of these regions may be modified in various ways. Furthermore, the two regions of DOE may be formed on a surface of the condenser lens or surfaces of the image reforming lenses opposing to the light receiving element arrays. However, it is preferable to form the two regions of DOE on the surfaces of the image reforming lenses opposing to the condenser lens as illustrated in FIG. 37, because when two regions are provided near the aperture stop, the two regions having substantially same area can be easily formed.

Twelfth Embodiment

FIG. 39 is a schematic view showing a twelfth embodiment of the focus detecting optical system according to the invention. In the present embodiment, the focus detecting optical system is applied to an image pick-up device for picking-up a visible light image while infrared or a longer wavelength of visible light is used as the auxiliary light. A whole construction of the focus detecting optical system is similar to that of the first embodiment shown in FIG. 7. The focus detecting optical system comprises aperture stop 128 arranged behind the reflecting member 7, image reforming lens 129 with DOE having a peak wavelength of the spectral diffractive efficiency within a range from 700 nm to 900 nm, half mirror 121 which transmits a half of a light flux emanating from the image reforming lens and reflects the remaining half of the light flux, mirror 122 reflecting a light flux transmitted through the half mirror, light receiving element array 120a which receives the light flux reflected by the half mirror and is arranged before a conjugate plane with a predetermined focal plane 4, and a light receiving element array 120b which receives the light flux reflected by the mirror and is arranged after the conjugate plane with the predetermined focal plane 4. The light receiving element arrays 120a and 120b are arranged on a same plane.

FIG. 40 is a plan view illustrating DOE of the image reforming lens 129. As shown in FIG. 40, the DOE is a circular grating. DOE is preferably formed by a kinoform, but may be formed by a binary optical element. A light flux emanating from an object to be picked-up is transmitted through the image pick-up lens 1 and quick return mirror 2, reflected by the sub-mirror 3 and is focused on the predetermined focal plane 4. When the image pick-up lens 1 is at an in-focused position, an image of the object is formed on the predetermined focal plane 4. A light flux transmitted through the predetermined focal plane 4 is passed through the field stop 5 arranged at the bottom of the mirror box and is made incident upon the focus detecting optical system. An entrance pupil of the focus detecting optical system is relayed by the condenser lens 6, is reflected by the reflecting member, and is made incident upon the image reforming lens 129 via the aperture stop 128. The visible light flux for use in picking-up the image of object is not subjected to the lens function of DOE, but is subjected to the lens function given by the general configuration of the image reforming lens 129. The auxiliary light flux is subjected both to the lens function of DOE and the lens function of the image reforming lens. The light flux emanating from the image reforming lens 129 is divided by the half mirror 121 into reflected light flux and transmitted light flux, which are then made incident upon the light receiving element arrays 120a and 120b, respectively. In the present embodiment, the auxiliary light flux and image picking-up light flux are subjected to the lens function independently from each other, and thus a decrease in a precision of the focus detection due to chromatic aberrations of the image pick-up lens and focus detecting optical system can be mitigated. According to the invention, a peak wavelength of the spectral diffraction efficiency of DOE may be set to a value within a range from 500 nm to 600 nm. Then, the visible light flux for use in the image pick-up is subjected to both the lens function of DOE and the lens function determined by the general configuration of the image reforming lens, while the auxiliary light flux is subjected solely to the lens function determined by the general configuration of the image reforming lens. FIG. 41 is a schematic view showing a known focus detecting optical system of contrast type using an image reforming lens of refraction type. In the known focus detecting optical system, the visible light and auxiliary light are focused at different points due to chromatic aberrations.

Thirteenth Embodiment

FIG. 42 is a schematic view showing a thirteenth embodiment of the focus detecting optical system according to the invention. The focus detecting optical system according to the present embodiment is of the contrast method. A whole construction of the focus detecting optical system is similar to that of the first embodiment shown in FIG. 7. The focus detecting optical system comprises aperture stop 128 arranged behind the reflecting member 7, image reforming lens 139 with DOE having two kinds of regions, half mirror 121 which transmits a half of a light flux emanating from the image reforming lens and reflects the remaining half of the light flux, mirror 122 reflecting a light flux transmitted through the half mirror, light receiving element array 120a which receives the light flux reflected by the half mirror and is arranged before a conjugate plane with a predetermined focal plane 4, and a light receiving element array 120b which receives the light flux reflected by the mirror and is arranged after the conjugate plane with the predetermined focal plane 4. The light receiving element arrays 120a and 120b are arranged on a same plane. DOE on the surface of the image reforming lens 139 is preferable formed by a kinoform, but may be formed by a binary optical element.

A light flux emanating from an object to be picked-up is transmitted through the image pick-up lens 1 and quick return mirror 2, reflected by the sub-mirror 3 and is focused on the predetermined focal plane 4. When the image pick-up lens 1 is at an in-focused position, an image of the object is formed on the predetermined focal plane 4. A light flux transmitted through the predetermined focal plane 4 is passed through the field stop 5 arranged at the bottom of the mirror box and is made incident upon the focus detecting optical system. Entrance pupils of the focus detecting optical system are relayed by the condenser lens 6, are reflected by the reflecting member, and are made incident upon the image reforming lens 139 via the aperture stop 128. DOE on the image reforming lens 129 has two regions having different lens functions, so that the light flux impinging upon the image reforming lens is subjected to the different lens functions. The light flux emanating from the image reforming lens 129 is divided into a reflected light flux and a transmitted light flux, which are then made incident upon the light receiving element arrays 120a and 120b, respectively via optical paths of different lengths. In this case, light fluxes emanating from a same point, but subjected to the different lens functions of the different regions of DOE are made incident upon the light receiving element array at two different points.

The image reforming lens 129 is constructed to have two focal points determined by the two different regions of DOE. Now it is assumed that light receiving elements in the light receiving element arrays 10a and 10b are arranged at a pitch P. Light emanating from a point Io on the predetermined focal plane 4 is focused substantially at two points P1 and P2 which are separated by P/2 in the direction in which light receiving elements are aligned. FIG. 43 is a plan view showing the construction of DOE formed on the image reforming lens 129. The image reforming lens 129 has a region CR1 for converging the light flux emanating from the point Io onto the point P1 and a region CR2 for converging the light flux onto the point P2. Each of these regions CR1 and CR2 is formed by diffractive gratings consisting of a part of concentric circles having a same center. Centers of the concentric circles forming the regions CR1 and CR2 are deviated from each other in the direction in which the light receiving element arrays 120a and 120b are aligned. In the present embodiment, a contrast at the Nyquist frequency which might produce moire can be set substantially to zero without decreasing a contrast at a lower frequency which is effective for detecting the focus condition. In this manner, DOE has a low pass function which can mitigate a deterioration of the focus detecting faculty.

In the present embodiment, since the image reforming lens 129 is formed by DOE, there is no step between the regions CR1 and CR2. If a plurality of lens function regions are formed in a usual refractive type lens, there is formed a step between these regions. The step does not have given lens function so that it does not contribute to the focus detection and might cause error. Moreover, the manufacture and estimation of the image reforming lens formed by DOE are easier than the usual refractive type lenses having a plurality of lens function regions. DOE can be easily formed by the lithographic method, because DOE can be manufactured easily from two-dimensional design information. Further, the manufactured DOE can be simply estimated from two-dimensional information obtained by inspecting DOE with a microscope. The two regions of DOE may be formed on a surface of the condenser lens, but it is preferable to form the two regions of DOE on the surface of the image reforming lenses opposing to the condenser lens, because when two regions are provided near the aperture stop 128 as shown in FIG. 42, the two regions having substantially same area can be easily formed. The low pass function on the light receiving element array 120a is different from that on the light receiving element array 120b. This might cause a decrease in a precision of focus detection. This decrease in a precision of focus detection may be mitigated by increasing a pitch of the light receiving element arrays from each other or by suitably processing output signals from these arrays electrically or in accordance with suitable software.

As explained above in detail, according to the invention, it is possible to provide the focus detecting optical system, in which various factors can be balanced to a high degree. That is, a whole length of the focus detecting optical system can be shortened, the light receiving element arrays can be arranged integrally on the same plane, a field of view can be widened, a precision of focus detection can be improved, the number of parts can be made smaller and the focus detecting optical system can be manufactured easily.

Now the advantageous effects of the present invention will be summarized as follows:

(1) It is possible to provide the compact focus detecting optical system having a wide field of view.

(2) It is possible to provide the compact focus detecting optical system having a high precision of focus detection.

(3) It is possible to provide the focus detecting optical system having good chromatic aberration as the focus detecting optical system, (4) It is possible to provide the focus detecting optical system, in which moire is scarcely produced and information under a de-focused condition can be easily obtained.

(5) It is possible to provide the focus detecting optical system, in which light receiving element arrays can be arranged at a high integration and a distance to an object to be picked-up can be measured with a high precision.

(6) It is possible to provide the focus detecting optical system, in which moire is scarcely produce, or light receiving element arrays can be arranged at a high integration in regardless of a positional relationship between the predetermined focal plane and the aperture stop and a distance to an object to be picked-up can be measured precisely.

(7) By adopting the above mentioned features (1) to (6) solely or in combination, it is possible to provide the focus detecting optical system in which various factors are highly balanced.

What is claimed is:

1. A focus detecting optical system for detecting a focus condition of an image of an object, said focus detecting optical system comprising:

a focus detecting optical means for reforming an image of an object formed on a first predetermined focal plane by an image forming optical system on a second focal plane; and a diffractive optical means having at least one optical function and arranged between said first predetermined focal plane and said second predetermined focal plane, said diffractive optical means comprising a surface having a diffraction grating whose pitch is continuously changed in an area in which a light flux having an optical axis is made incident.

2. A focus detecting optical system according to claim 1, wherein said focus detecting optical means comprises a condenser lens arranged in a vicinity of said first predetermined focal plane of the image forming optical system, an aperture stop arranged to act upon a light flux emanating from the condenser lens, one or more image reforming lenses for converging a light flux transmitted through the aperture stop, and a photoelectric converting means for receiving one or more light fluxes emanating from said one or more image reforming lenses, and said diffraction grating includes at least one diffractive optical element.

3. A focus detecting optical system according to claim 2, wherein:

said surface having said diffraction grating is a surface of said condenser lens; and said diffraction grating has a lens function.

4. A focus detecting optical system according to claim 3, wherein said condenser lens is constructed to satisfy the following condition:

$$0.2 < D/fc < 2.5$$

wherein D is a maximum effective diameter of the condenser lens and fc is a focal length of the condenser lens.

5. A focus detecting-optical system according to claim 2, wherein:

said aperture stop includes a pair of apertures which are arranged side by side with a distance selected to attain a desired precision of focus detection; and said at least one diffractive optical element comprises one or more diffractive optical elements formed in one or more surfaces of said one or more image reforming lenses.

6. A focus detecting optical system according to claim 2, wherein:

said aperture stop includes a pair of apertures which are arranged side by side with a distance selected to attain a desired precision of focus detection;

said at least one diffractive optical element comprises a pair of diffractive optical elements formed in surfaces of said one or more image reforming lenses; and said aperture stop is integrally formed by said pair of diffractive optical elements.

7. A focus detecting optical system according to claim 2, wherein said aperture stop includes a pair of apertures which are arranged side by side with a distance selected to attain a desired precision of focus detection and at least one surface of the image reforming lens is formed by a diffractive optical element having deflecting function.

8. A focus detecting optical system according to claim 2, wherein:

said aperture stop includes a pair of apertures which are arranged side by side with a distance selected to attain a desired precision of focus detection; and said at least one diffractive optical element comprises a pair of diffractive optical elements, each of which includes a plurality of regions whose peaks of spectral diffraction efficiency appear at different wavelengths.

9. A focus detecting optical system according to claim 2, wherein said focus detecting optical means includes one or more diffractive optical elements arranged along an optical axis extending from said first predetermined focal plane and said second predetermined focal plane, and the number of said diffractive optical elements Q satisfies the following condition:

$$1 \leq Q \leq 5.$$

10. A focus detecting optical system according to claim 2, wherein said at least one diffractive optical element includes at least one diffractive optical element having a spectral diffraction efficiency for a particular wavelength exceeds 67%.

11. A focus detecting optical system according to claim 2, wherein said at least one diffractive optical element of the diffractive optical means is formed by a kinoform.

12. A focus detecting optical system according to claim 2, wherein said at least one diffractive optical element of the diffractive optical means is formed by a binary optical element.

13. A focus detecting optical system according to claim 12, wherein said binary optical element of the at least one diffractive optical element of the diffractive optical means is formed by a binary optical element of more than four-step simulation.

14. A focus detecting optical system according to claim 1, wherein said diffraction grating comprises a circular diffraction grating.

15. A focus detecting optical system according to claim 1, wherein:

said diffraction grating comprises a plurality of rectilinear diffraction gratings, each of which has a pitch which is continuously changed in a first direction; and said plurality of rectilinear diffraction gratings are arrayed in a second direction which is perpendicular to said first direction.

16. A focus detecting optical system according to claim 1, wherein said diffraction grating includes a plurality of regions, each having a diffraction grating element.

17. A focus detecting optical system for detecting a focus condition of an image of an object comprising:

a condenser lens arranged in a vicinity of a predetermined focal plane of an image forming optical system;

an aperture stop including at least one pair of apertures which are separated from each other by a distance which can guarantee a desired precision of focus detection;

at least one pair of image reforming lenses corresponding to said at least one pair of apertures of the aperture stop and converging light fluxes transmitted through the aperture stop;

at least one pair of light receiving element arrays for receiving at least one pair of light fluxes emanating from said at least one pair of image reforming lenses, said light receiving element arrays being arranged in parallel with each other;

a field stop means for restricting a field of view in a direction perpendicular to a direction in which light receiving elements of said light receiving element arrays are aligned; and a diffractive optical means having lens function with different powers in a direction in which light receiving elements are aligned and in a direction perpendicular to the direction in which said light receiving elements are aligned.

18. A focus detecting optical system according to claim 17, wherein said diffractive optical means comprises a diffraction grating having an elliptical shape.

* * * * *